(12) United States Patent
Shirota et al.

(10) Patent No.: US 9,376,532 B2
(45) Date of Patent: Jun. 28, 2016

(54) QUATERNARY AMMONIUM SALT COMPOUND

(71) Applicant: KAO CORPORATION, Tokyo (JP)

(72) Inventors: Kyoichi Shirota, Wakayama (JP); Tsuyoshi Egawa, Wakayama (JP); Katsuhisa Inoue, Wakayama (JP); Yasuyuki Mimura, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/758,139

(22) PCT Filed: Dec. 27, 2013

(86) PCT No.: PCT/JP2013/085088
§ 371 (c)(1),
(2) Date: Jun. 26, 2015

(87) PCT Pub. No.: WO2014/104288
PCT Pub. Date: Jul. 3, 2014

(65) Prior Publication Data
US 2015/0329674 A1    Nov. 19, 2015

(30) Foreign Application Priority Data
Dec. 28, 2012 (JP) .................................. 2012-288423
Jul. 11, 2013 (JP) .................................. 2013-145705

(51) Int. Cl.
| | | |
|---|---|---|
| *C08G 73/02* | (2006.01) | |
| *C08G 65/333* | (2006.01) | |
| *C09B 67/46* | (2006.01) | |
| *G02B 5/22* | (2006.01) | |
| *C11D 3/37* | (2006.01) | |

(52) U.S. Cl.
CPC .............. *C08G 73/02* (2013.01); *C08G 65/333* (2013.01); *C08G 73/0206* (2013.01); *C08G 73/0226* (2013.01); *C09B 67/009* (2013.01); *C09B 67/0086* (2013.01); *G02B 5/223* (2013.01); *C11D 3/3723* (2013.01)

(58) Field of Classification Search
CPC ............. C11D 3/3723; C08G 73/0206; C08G 73/0226; C08G 73/0233
See application file for complete search history.

(56) References Cited

U.S. PATENT DOCUMENTS

| | | | | |
|---|---|---|---|---|
| 4,161,581 A | * | 7/1979 | Wagner ................ | C07D 265/08 525/411 |
| 6,034,271 A | | 3/2000 | Kwetkat | |
| 2009/0215662 A1 | | 8/2009 | Boeckh et al. | |

FOREIGN PATENT DOCUMENTS

| | | | |
|---|---|---|---|
| CN | 102126972 | * | 7/2011 |
| JP | 2-172920 A | | 7/1990 |
| JP | 2000-506131 A | | 5/2000 |
| JP | 2008-535991 A | | 9/2008 |
| JP | 2008-248255 A | | 10/2008 |
| JP | 2009-175613 A | | 8/2009 |
| JP | 2011-75846 A | | 4/2011 |
| RU | 2221775 | * | 10/2003 |

OTHER PUBLICATIONS

USPTO structure search, Feb. 2016.*
International Search Report issued in PCT/JP2013/085088, mailed on Apr. 1, 2014.

* cited by examiner

*Primary Examiner* — Gregory Listvoyb
(74) *Attorney, Agent, or Firm* — Birch, Stewart, Kolasch & Birch, LLP

(57) ABSTRACT

The present invention provides a novel quaternary ammonium salt compound that is excellent in atomization of a pigment dispersion and storage stability, a dispersant containing the quaternary ammonium salt compound, a use of the quaternary ammonium salt compound, and a process for producing the quaternary ammonium salt compound. The present invention relates to [1] a quaternary ammonium salt compound represented by the general formula (I); [2] a dispersant containing the compound of the above [1]; [3] a use of the compound of the above [1] for dispersing a pigment; and [4] a process for producing a quaternary ammonium salt compound represented by the general formula (I), including a step of reacting a halogenated alkyl ester compound represented by the general formula (II) with a polyamine compound represented by the general formula (III).

10 Claims, 1 Drawing Sheet

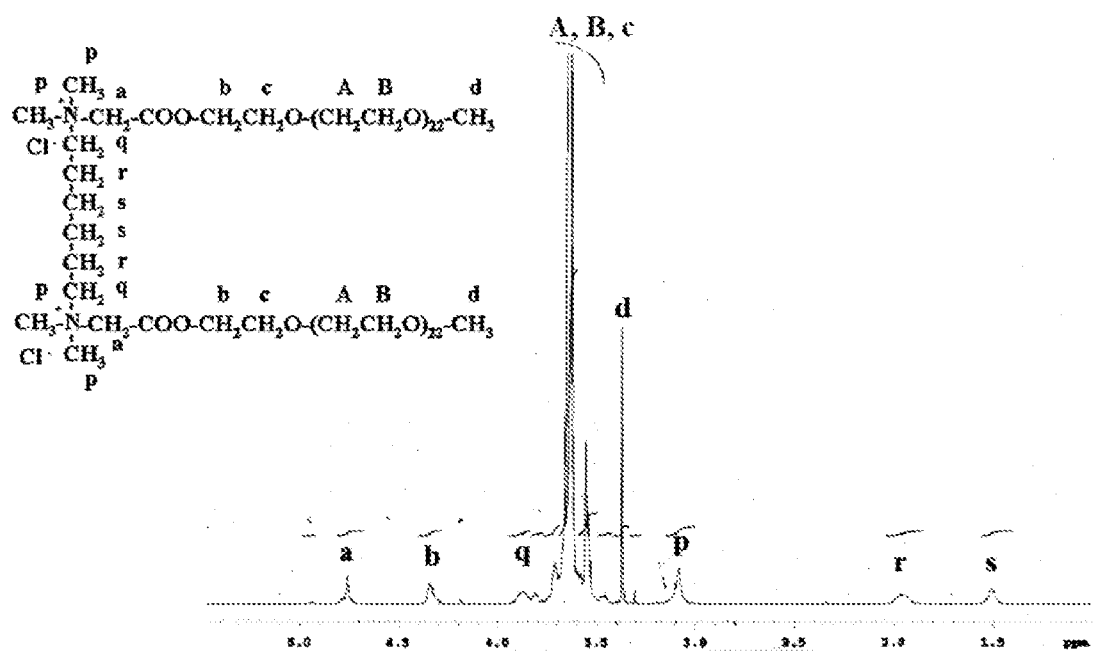

QUATERNARY AMMONIUM SALT COMPOUND

FIELD OF THE INVENTION

The present invention relates to a quaternary ammonium salt compound, and more particularly, to a quaternary ammonium group-containing compound useful as a dispersant, a dispersant containing the compound, a use of the compound, and a process for producing the quaternary ammonium salt compound.

BACKGROUND OF THE INVENTION

In recent years, with the progress of industrial fields such as electronic parts, batteries, printing and liquid crystal displays, there is an increasing demand for dispersions prepared by dispersing functional particles in a solvent. Further, it has been vigorously attempted to develop dispersants capable of dispersing particles with a polarity on a surface thereof, such as pigments, in a non-aqueous solvent such as an organic solvent.

For example, when pigments are dispersed in an organic solvent by using the dispersants, it is possible to obtain a non-aqueous pigment dispersion. Color filters used in liquid crystal displays are produced by a lithographic method in which a colored composition prepared by compounding a resin, etc., into the non-aqueous pigment dispersion, is applied onto a transparent substrate such as glass, and then successively subjected to exposure to light, curing, development and heat curing, and the like. As the in-oil dispersant used for producing the nom-aqueous pigment dispersion, there are known polymeric dispersants such as graft polymers. In order to satisfy various performances as required, studies on improvement of the dispersants have been made.

For example, Patent Literature 1 aims at achieving both of a good dispersibility of a pigment in a dispersion and a good coatability of the dispersion by improving a wettability (affinity) between the dispersing medium and a surface of the pigment, and discloses a pigment dispersion including a polyurethane-based dispersant containing a structural unit having an ethyleneoxide chain and a propyleneoxide chain, and an amino group quaternarized by a quaternarizing agent.

Patent Literature 2 aims at facilitating removal of dried aggregates generated upon coating, and discloses a pigment dispersion including a block copolymer containing an amino group that partially forms a salt with an allyl halide and/or an aralkyl halide.

Patent Literature 3 aims at satisfying a high optical transparency, a high concentration of a composition, and a good coatability thereof, and discloses a colored resin composition including a binder resin and an A-B block copolymer and/or a B-A-B block copolymer which contain a block A containing a quaternary ammonium salt group on a side chain thereof and a block B containing no quaternary ammonium salt group.

CITATION LIST

Patent Literature

Patent Literature 1: JP 2009-175613A
Patent Literature 2: JP 2011-75846A
Patent Literature 3: JP 2008-248255A

SUMMARY OF THE INVENTION

The present invention relates to the following aspects [1] to [4]. [1] A quaternary ammonium salt compound represented by the general formula (I):

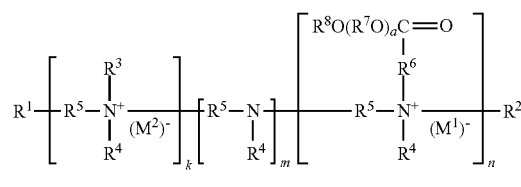

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms with the proviso that $R^5$ adjacent to $R^1$ represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order.
[2] A dispersant including the compound according to the above aspect [1].
[3] A use of the compound according to the above aspect [1] for dispersing a pigment.
[4] A process for producing a quaternary ammonium salt compound represented by the general formula (I), including a step of reacting a halogenated alkyl ester compound represented by the general formula (II) with a polyamine compound represented by the general formula (III):

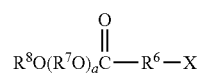

wherein $R^6$, $R^7$, $R^8$ and a are the same as defined above; and X is a halogen atom; and

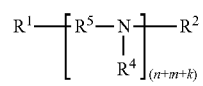

wherein $R^1$, $R^2$, $R^4$, $R^5$ and (n+m+k) are the same as defined above.

BRIEF DESCRIPTION OF THE DRAWING

FIG. 1 is an NMR chart of a compound (8).

DETAILED DESCRIPTION OF THE INVENTION

For example, in order to improve a contrast ratio of color filters, a pigment used therein is atomized into still finer particles. However, the thus atomized particles of the pigment, etc., tend to be often enhanced in cohesive force therebetween, and as a result, tend to aggregate together in a dispersion and to form particles having a large particle size. For this reason, the dispersion containing the atomized particles tends to be deteriorated in storage stability.

In consequence, studies on use of a dispersant into which an adsorbing group having an excellent adsorption onto a surface of the particles such as pigments, etc. and a dispersing group having an excellent affinity to a solvent are introduced have been made to improve dispersing characteristics of the dispersion. However, even when using such a dispersant, the dispersion is still hardly improved in atomization and suppression of aggregation of particles therein to a satisfactory extent. Therefore, there is an increasing demand for a dispersant capable of atomizing particles such as pigments and further producing a dispersion having an excellent storage stability.

The present invention aims at providing a novel quaternary ammonium salt compound that is excellent in atomization of particles such as pigments in a dispersion and storage stability of the dispersion, a dispersant containing the quaternary ammonium salt compound, a use of the quaternary ammonium salt compound, and a process for producing the quaternary ammonium salt compound.

The present inventors have found that by using a quaternary ammonium salt compound represented by the below-mentioned general formula (I) (hereinafter also referred to as a "compound of the present invention") in a dispersion containing particles of a pigment, etc., the particles of a pigment, etc., can be effectively atomized in the dispersion, and the resulting dispersion is excellent in storage stability.

The present invention relates to the following aspects [1] to [4]. [1] A quaternary ammonium salt compound represented by the general formula

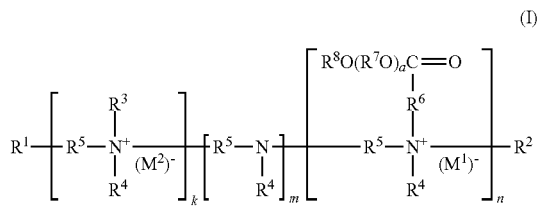

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms with the proviso that $R^5$ adjacent to $R^1$ represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order.

[2] A dispersant including the compound according to the above aspect [1].

[3] A use of the compound according to the above aspect [1] for dispersing a pigment.

[4] A process for producing a quaternary ammonium salt compound represented by the general formula (I), including a step of reacting a halogenated alkyl ester compound represented by the general formula (II) with a polyamine compound represented by the general formula (III):

wherein $R^6$, $R^7$, $R^8$ and a are the same as defined above; and X is a halogen atom; and

wherein $R^1$, $R^2$, $R^4$, $R^5$ and (n+m+k) are the same as defined above.

In accordance with the present invention, there are provided a novel compound that is excellent in atomization of particles of a pigment, etc., in a dispersion and in a storage stability of the dispersion, a dispersant containing the compound, a use of the compound, and a process for producing the quaternary ammonium salt compound.

The present invention relates to a quaternary ammonium salt compound represented by the above general formula (I), and a dispersant containing the quaternary ammonium salt compound. The compound of the present invention and the dispersant containing the compound are excellent in atomization of particles in a dispersion and in a storage stability of the dispersion. The reason therefor is considered as follows though it is not clearly determined. In the following, a pigment dispersion for color filters is explained as an example of the above dispersion.

The compound of the present invention contains an alkoxy polyalkylene glycol group having a high affinity to a solvent, and a quaternary ammonium group capable of maintaining a strong adsorption to a surface of a pigment for a long period of time. When using the compound of the present invention as a pigment dispersant in a pigment dispersion for color filters, it is considered that the alkoxy polyalkylene glycol group contained in the compound of the present invention is spread in the solvent, and a strong repulsion force is caused between pigment particles, so that aggregation between the pigment particles can be effectively prevented. In addition, since it is possible to accurately control the number of quaternary ammonium groups per a molecule of the compound of the present invention despite of a high-molecular compound, the compound can be improved in uniformity of adsorption to the pigment fine particles in the pigment dispersion, and further crosslinking adsorption between the fine particles which will result in aggregation thereof can be extremely hardly caused. For this reason, it is considered that the compound is excellent in atomization of particles when dispersed in a dispersion, and in a storage stability of the resulting dispersion. However, it should be noted that the above-discussed mechanism is a mere conjecture, and therefore the present invention is not particularly limited thereto.

In the following, the structure of the compound of the present invention, the process for producing the compound, and use and applications of the compound are explained.

The compound of the present invention is represented by the general formula (I):

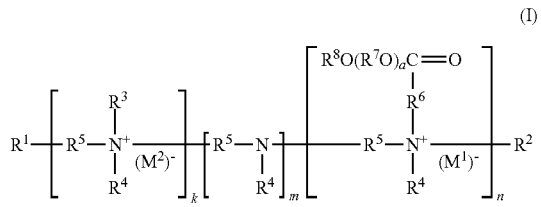

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms with the proviso that $R^5$ adjacent to $R^1$ represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order.

From the viewpoints of a good dispersibility and a good storage stability, (n+m+k) is an integer of not more than 22, preferably an integer of not more than 11, more preferably an integer of not more than 7, and still more preferably an integer of not more than 4, and is also an integer of not less than 2. In addition, from the viewpoints of attaining more excellent dispersibility and storage stability, (n m+k) is more preferably 2 or 3, and still more preferably 2.

From the viewpoints of a good dispersibility and a good storage stability, n is an integer of not more than 22, preferably an integer of not more than 11, more preferably an integer of not more than 7, still more preferably an integer of not more than 4, and even still more preferably an integer of not more than 3, and is also an integer of not less than 1, and preferably an integer of not less than 2. In addition, from the viewpoints of attaining more excellent dispersibility and storage stability, n is more preferably 2 or 3, and still more preferably 2.

From the viewpoints of a good dispersibility and a good storage stability, m is an integer of not more than 21, preferably an integer of not more than 9, more preferably an integer of not more than 5, and still more preferably an integer of not more than 2, and is also an integer of not less than 0. In addition, from the viewpoints of attaining more excellent dispersibility and storage stability, m is more preferably 0 or 1, and from the viewpoint of a high dispersibility, m is preferably 0, whereas from the viewpoint of a high storage stability, m is preferably 1.

From the viewpoints of a good dispersibility and a good storage stability, k is an integer of not more than 21, preferably an integer of not more than 9, more preferably an integer of not more than 5, and still more preferably an integer of not more than 1, and is also an integer of not less than 0. In addition, from the viewpoints of attaining more excellent dispersibility and storage stability, k is more preferably 0 or 1, and still more preferably 0.

In the present invention, the compound represented by the general formula (I) may be in the form of a mixture of a plurality of compounds that are different in values of n, m and k from each other.

In this case, $(n+m+k)_{av}$ as an average value of (n+m+k) is preferably not more than 10, more preferably not more than 5, and still more preferably not more than 3.2, from the viewpoints of a good dispersibility and a good storage stability. Also, from the viewpoint of a high dispersibility, $(n+m+k)_{av}$ is preferably not more than 2.5, and more preferably not more than 2.2, and from the viewpoint of a high storage stability, $(n+m+k)_a$, is preferably not less than 2.0, more preferably not less than 2.5, and still more preferably not less than 2.8.

From the viewpoints of a good dispersibility and a good storage stability, $n_{av}$ as an average value of n is preferably not more than 10, more preferably not more than 5, still more preferably not more than 3, even still more preferably not more than 2.5, and further even still more preferably not more than 2.2. Also, from the same viewpoints, $n_{av}$ is preferably not less than 1.0, more preferably not less than 1.5, still more preferably not less than 1.7, even still more preferably not less than 1.9, and further even still more preferably not less than 2.

From the viewpoints of a good dispersibility and a good storage stability, $m_{av}$ as an average value of m is preferably not more than 9, more preferably not more than 3, and still more preferably not more than 1.3. Also, from the viewpoint of a high dispersibility, $m_{av}$ is preferably not more than 0.5, and more preferably not more than 0.2. From the viewpoint of a high storage stability, $m_{av}$ is preferably not less than 0, more preferably not less than 0.1, and still more preferably not less than 0.2.

From the viewpoints of a good dispersibility and a good storage stability, $k_{av}$ as an average value of k is preferably not more than 9, more preferably not more than 3, still more preferably not more than 1.2, even still more preferably not more than 0.5, and further even still more preferably not more than 0.2, and is also preferably not less than 0, and even still more preferably 0.

The ratio of $n_{av}$ as an average value of n to $(n+m+k)_{av}$ as an average value of $(n+m+(n_{av}/(n+m+k)_{av})$ is preferably not less than 0.3, more preferably not less than 0.6, still more preferably not less than 0.8, even still more preferably not less than 0.9, and further even still more preferably 1.0, from the viewpoints of a good dispersibility and a good storage stability, and is also preferably not more than 1.0, from the viewpoint of facilitated production of the compound of the present invention.

The aforementioned $n_{av}$, $m_{av}$, $k_{av}$ and $(n+m+k)_{av}$ may be measured by the respective methods described in Examples below.

Meanwhile, the structural units whose numbers are represented by n, m and k, respectively, may be arranged in any order. When any one or more of n, m and k are a plural number, the respective structural units may be arranged in any order and in any form such as a random form and a block form.

The number of carbon atoms of each of 10, $R^2$ and $R^4$ is not more than 10, preferably not more than 8, still more preferably not more than 6, and even still more preferably not more than 1, from the viewpoints of a good dispersibility and a good storage stability.

$R^1$, $R^2$ and $R^4$ are each preferably a hydrocarbon group that is substituted with no hydroxyl group.

Specific examples of $R^1$, $R^2$ and $R^4$ include at least one group selected from the group consisting of a methyl group, an ethyl group, a butyl group, a hexyl group, a hydroxymethyl group, a hydroxybutyl group and a hydroxyhexyl group, preferably at least one group selected from the group consisting of a methyl group and an ethyl group, and more preferably a methyl group.

$R^1$ and $R^2$ are each preferably a hydrocarbon group having not less than 1 and not more than 10 carbon atoms or a hydroxyalkyl group having not less than 2 and not more than 6 carbon atoms; more preferably a hydrocarbon group having not less than 1 and not more than 5 carbon atoms or a hydroxyalkyl group having not less than 3 and not more than 6 carbon atoms; still more preferably a hydrocarbon group having not less than 1 and not more than 3 carbon atoms or a hydroxyalkyl group having not less than 4 and not more than 6 carbon atoms; and even still more preferably a hydrocarbon group having not less than 1 and not more than 3 carbon atoms.

The number of carbon atoms of $R^4$ is preferably not more than 4, and more preferably not more than 3, and $R^4$ is preferably a methyl group or an ethyl group, and more preferably a methyl group.

The number of carbon atoms of the alkanediyl group as $R^5$ is not less than 1, preferably not less than 2, and more preferably not less than 3, and is also not more than 18, preferably not more than 14, more preferably not more than 10, and still more preferably not more than 6, from the viewpoints of a good dispersibility and a good storage stability.

Examples of the alkanediyl group as $R^5$ include at least one group selected from the group consisting of a methylene group, an ethylene group, various propanediyl groups, various hexanediyl groups, various octanediyl groups and various nonanediyl groups. Of these groups, from the viewpoints of a good dispersibility and a good storage stability, preferred is at least one group selected from the group consisting of a propane-1,3-diyl group, a hexane-1,6-diyl group and a nonane-1,9-diyl group; more preferred is at least one group selected from the group consisting of a propane-1,3-diyl group and a hexane-1,6-diyl group; and still more preferred is a hexane-1,6-diyl group.

The number of carbon atoms of $R^6$ is not more than 4, preferably not more than 3, more preferably not more than 2, and still more preferably 1, from the viewpoint of facilitated production of the compound of the present invention. The preferred group as $R^6$ is a methylene group.

The number of carbon atoms of $R^7$ is not more than 4, and preferably not more than 3, and is also preferably not less than 2, from the viewpoints of a good dispersibility and a good storage stability. The preferred group as $R^7$ is at least one group selected from the group consisting of an ethylene group and a propylene group.

From the viewpoints of a good dispersibility and a good storage stability, a is not less than 1, preferably not less than 15, more preferably not less than 21, still more preferably not less than 30, and even still more preferably not less than 40, and is also not more than 100, preferably not more than 95, more preferably not more than 70, and still more preferably not more than 50.

If a plurality of ($R^7$O) groups are present, the groups may be the same or different from each other. The plurality of ($R^7$O) groups may be arranged in either a random form or a block form.

In addition, ($R^7$O) preferably contains a structural unit derived from propyleneoxide, and more preferably contains a structural unit derived from propyleneoxide and a structural unit derived from ethyleneoxide, from the viewpoint of a good affinity to a solvent.

In the above general formula (I), $(R^7O)_a$ is preferably a structural unit represented by the following general formula (I-a), from the viewpoints of a good dispersibility and a good storage stability.

$$*(\text{PO})_b(\text{EO})_c*  \qquad (\text{I-a})$$

In the formula (I-a), PO is a propyleneoxide unit; EO is an ethyleneoxide unit; b and c represent average molar numbers of addition of the propyleneoxide unit and ethyleneoxide unit, respectively, b is not less than 0 and not more than 100, and c is not less than 0 and not more than 100, with the proviso that (b c) is not less than 1 and not more than 100; and * represents a bonding site. Meanwhile, the structural unit represented by the general formula (I-a) is preferably in the form of a block polymer, and more preferably a diblock polymer, and it is preferred that the terminal end on the (PO) side of the above formula (I-a) is bonded to $R^8O$, whereas the terminal end on the (EO) side of the above formula (I-a) is bonded to a carbonyl group.

From the viewpoints of a good dispersibility and a good storage stability, b is preferably not less than 11, more preferably not less than 15, still more preferably not less than 21, and even still more preferably not less than 25. Also, from the viewpoints of a good dispersibility and facilitated production of the compound of the present invention, b is preferably not more than 60, more preferably not more than 50, and still more preferably not more than 35.

From the viewpoints of a good dispersibility, a good storage stability and facilitated production of the compound of the present invention, c is preferably not less than 1, more preferably not less than 5, still more preferably not less than 11, and even still more preferably not less than 15. Also, from the viewpoint of a good solubility in a solvent, c is preferably not more than 95, preferably not more than 70, still preferably not more than 50, even still more preferably not more than 30, and further even still more preferably not more than 20.

A sum of b and c (b+c) is preferably not less than 15, more preferably not less than 21, still more preferably not less than 30, and even still more preferably not less than 40, and is also preferably not more than 95, more preferably not more than 70, and still more preferably not more than 50, from the viewpoints of a good dispersibility and a good storage stability.

The ratio of b to a sum of b and c (b/(b+c)) is preferably not less than 0.2, more preferably not less than 0.4, and still more preferably not less than 0.5, from the viewpoints of a good dispersibility, a good storage stability and a good solubility in a solvent, and is also preferably not more than 0.97, more preferably not more than 0.86, and still more preferably not more than 0.8, from the viewpoints of a good dispersibility and facilitated production of the compound of the present invention.

The number of carbon atoms of $R^8$ is not less than 1, preferably not less than 6, and more preferably not less than 10, and is also not more than 18, preferably not more than 16, more preferably not more than 14, and still more preferably not more than 12, from the viewpoints of a good dispersibility and a good storage stability. As $R^8$, there is mentioned at least one group selected from the group consisting of a methyl group, an ethyl group, a decyl group, a lauryl group, a myristyl group, a cetyl group, an oleyl group and a stearyl group. Of these groups, from the viewpoints of a good dispersibility and a good storage stability, preferred is at least one group selected from the group consisting of a methyl group, a decyl group, a lauryl group, an oleyl group and a stearyl group; more preferred is at least one group selected from the group consisting of a decyl group and a lauryl group; and still more preferred is a lauryl group.

The number of carbon atoms of $R^3$ is not more than 10, preferably not more than 7, more preferably not more than 4, and still more preferably not more than 2, and is also not less than 1, from the viewpoints of a good dispersibility and a good storage stability. As $R^3$, there is mentioned at least one group selected from the group consisting of a methyl group, an ethyl group, a propyl group and a benzyl group. Of these groups, from the viewpoints of a good dispersibility and a good storage stability, preferred is a methyl group.

$(M^1)^-$ and $(M^2)^-$ are each independently an anion. $(M^1)^-$ and $(M^2)^-$ are each preferably at least one anion selected from the group consisting of a halide ion, an alkylsulfuric acid ion, an alkylbenzenesulfonic acid ion and an alkylcarbonic acid ion, from the viewpoints of a good dispersibility, a good storage stability and facilitated production of the compound of the present invention.

From the viewpoints of a good dispersibility, a good storage stability and facilitated production of the compound of the present invention, $(M^1)^-$ is preferably a halide ion, more preferably at least one anion selected from the group consisting of a chloride ion, a bromide ion and an iodide ion, and still more preferably a chloride ion.

From the viewpoint of facilitated production of the compound of the present invention, $(M^2)^-$ is preferably at least one anion selected from the group consisting of $CH_3SO_4^-$, $C_2H_5SO_4^-$ and $CH_3C_6H_4SO_3^-$, more preferably at least one anion selected from the group consisting of $CH_3SO_4^-$ and $C_2H_5SO_4^-$, and still more preferably $CH_3SO_4^-$. Also, from the viewpoints of a good dispersibility and a good storage stability, $(M^2)^-$ is preferably a halide ion, more preferably at least one anion selected from the group consisting of a chloride ion, a bromide ion and an iodide ion, and still more preferably a chloride ion.

As is recognized from the above description, from the viewpoint of a good storage stability of the obtained dispersion, m and k are each preferably 0. More specifically, the compound of the present invention is preferably a compound represented by the following general formula (I-1):

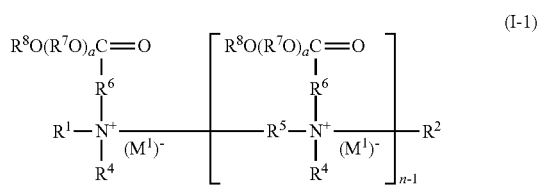

(I-1)

wherein $R^1$, $R^2$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ is an anion; n is an integer of not less than 2 and not more than 22; and if a plurality of ($R^7O$) groups are present, the groups may be the same or different from each other.

Meanwhile, the preferred $R^1$, $R^2$, $R^4$, $R^5$, $R^6$, $R^7$, $R^8$, a and $(M^1)^-$ are the same as those of the compound of the above formula (I).

From the viewpoints of a good dispersibility and a good storage stability, n in the above general formula (I-1) is an integer of not more than 22, preferably an integer of not more than 11, more preferably an integer of not more than 7, and still more preferably an integer of not more than 4, and is also an integer of not less than 2. In addition, from the viewpoint of attaining more excellent dispersibility and storage stability, n is even still more preferably 2 or 3, and further even still more preferably 2.

From the viewpoints of a good dispersibility and a good storage stability, the average value of n in the above general formula (I-1) is preferably not more than 10, more preferably not more than 5, still more preferably not more than 3, even still more preferably not more than 2.5, and further even still more preferably not more than 2.2. Also, from the viewpoint of attaining more excellent dispersibility and storage stability, the average value of n in the above general formula (I-1) is preferably not less than 1.5, more preferably not less than 1.7, still more preferably not less than 1.9, and even still more preferably not less than 2.

From the viewpoints of a good dispersibility and a good storage stability, the weight-average molecular weight of the quaternary ammonium salt compound of the present invention is preferably not less than 2,000, more preferably not less than 3,000, and still more preferably not less than 3,500, and is also preferably not more than 35,000, more preferably not more than 20,000, and still more preferably not more than 10,000. The weight-average molecular weight of the compound may be measured by the method described in Examples below.

[Process for Producing Quaternary Ammonium Salt Compound]

The quaternary ammonium salt compound of the present invention is preferably produced, for example, by reacting a halogenated alkyl ester compound represented by the general formula (II) with a polyamine compound represented by the general formula (III), from the viewpoint of accurately controlling the number of quaternary ammonium groups per a molecule of the compound:

(II)

wherein $R^6$, $R^7$, $R^8$ and a are the same as defined above; and X is a halogen atom; and

(III)

wherein $R^1$, $R^2$, $R^4$, $R^5$ and (n+m+k) are the same as defined above.

The above raw materials are reacted with each other in a solvent-free condition or in a solvent to thereby obtain the compound of the present invention.

Examples of the preferred solvent used in the above reaction include the below-mentioned ether-based organic solvents as used in the present invention. Of the ether-based organic solvents, preferred are (poly)alkylene glycol monoalkyl ether acetates; more preferred are propylene glycol monomethyl ether acetate (hereinafter also referred to as "PGMEA") and diethylene glycol monobutyl ether acetate (hereinafter also referred to as "BCA"); and still more preferred is PGMEA.

The halogenated alkyl ester represented by the above general formula (II) may be produced, for example, by reacting an alcohol containing the hydrocarbon group as $R^8$ and an alkyleneoxide compound capable of forming $R^7O$ in the presence of a basic substance to obtain an alkoxy polyalkylene glycol, and further subjecting the resulting alkoxy polyalkylene glycol to dehydration condensation reaction with an alkyl halide-containing carboxylic acid. Meanwhile, the term "alkoxy" as used in the present specification means a concept including both alkyloxy and alkenyloxy.

The polyamine compound represented by the above general formula (III) may be produced, for example, by the method in which an alkylene diol and a primary or secondary amine are reacted in the presence of a Cu—Ni catalyst, or the method in which an alkylene diamine is reduced and alkylated with an aldehyde.

In addition, as the polyamine compound, there may also be used commercially available products such as N,N,N',N'-tetramethyl hexanediamine "KAOLIZER NO. 1" available from Kao Corporation, N,N,N',N'-tetramethyl propanediamine "KAOLIZER NO. 2" available from Kao Corporation, a polyamine glycol "KAOLIZER P200" available from Kao Corporation, etc.

In the reaction for obtaining the quaternary ammonium salt compound of the present invention, the ratio of an amount (mol) of the halogenated alkyl ester compound represented by the general formula (II) on the basis of the number of amine functional groups of the polyamine compound represented by the general formula (III) ((n+m+k) in the general formula (III) x mol) may be appropriately selected according to the aimed compound, and is, for example, from 0.3 to 1.2. By appropriately selecting the above ratio, it is possible to obtain a compound that is well controlled in numbers of n and m on the basis of (n+m+k) in the general formula (I). The ratio between amounts of the polyamine compound and the halogenated alkyl ester compound which are to be reacted with each other is preferably controlled on the basis of a mole equivalent of the polyamine compound calculated from an amine value thereof, and a mole equivalent of the halogenated alkyl ester compound calculated from a content of a halogen atom therein, from the viewpoint of more accurately controlling the numbers of n and m.

Also, the reaction atmosphere used in the above reaction step is preferably a nitrogen gas atmosphere or an atmosphere of an inert gas such as argon.

The reaction temperature used in the above reaction step is, for example, preferably not lower than 50° C., and more preferably not lower than 80° C., and is also preferably not higher than 100° C.

The compound of the general formula (I) in which k is an integer of 1 or more may be produced, for example, by treating a compound of the general formula (I) in which m is an integer of 1 or more with a quaternarizing agent.

As the quaternarizing agent, there may be used a substance capable of reacting with a tertiary amino group to convert the amino group into a quaternary ammonium group. Examples of the quaternarizing agent include dialkyl sulfates, alkyl halides and alkyl p-toluenesulfonates. Specific examples of the dialkyl sulfates include dimethyl sulfate and diethyl sulfate. Specific examples of the alkyl halides include methyl chloride, methyl iodide and benzyl chloride. Specific examples of the alkyl p-toluenesulfonates include methyl p-toluenesulfonate and ethyl p-toluenesulfonate. Of these quaternarizing agents, preferred are dialkyl sulfates; more preferred are dimethyl sulfate and diethyl sulfate; and still more preferred is dimethyl sulfate.

In the treatment with the quaternarizing agent, there may be used the same solvent as used in the above reaction. In addition, the reaction atmosphere used in the treatment step is preferably a nitrogen atmosphere or an atmosphere of an inert gas such as argon.

The reaction temperature used in the treatment step may vary depending upon the kind of quaternarizing agent used, and is preferably not lower than 50° C. From the viewpoint of promoting the reaction, the reaction temperature is more preferably not lower than 80° C., and is also preferably not higher than 100° C.

[Use and Applications of Compound]

The compound of the present invention is used as a dispersant, preferably as a dispersant for particles of a pigment, etc., and more preferably as a pigment dispersant.

Further, when used as a pigment dispersion for color filters which includes a pigment dispersant containing the compound of the present invention, an organic pigment and a non-aqueous solvent such as an ether-based organic solvent, it is possible to obtain the pigment dispersion in which the pigment is well atomized and which is excellent in storage stability.

<Pigment>

The pigment used herein may be either an organic pigment or an inorganic pigment. Examples of the inorganic pigment include carbon blacks, titanium oxide, zinc oxide and extender pigments. Specific examples of the extender pigments include talc, clay and calcium carbonate. The compound of the present invention is preferably used for dispersing at least one pigment selected from the group consisting of organic pigments and carbon blacks, and more preferably used for dispersing organic pigments.

The organic pigments used in the applications of the compound of the present invention are preferably those pigments suitably used for color filters. Examples of the organic pigments include azo pigments, phthalocyanine pigments, condensed polycyclic pigments and lake pigments.

Specific examples of the azo pigments include insoluble azo pigments such as C.I. Pigment Red 3, soluble azo pigments such as C.I. Pigment Red 48:1, and condensed azo pigments such as C.I. Pigment Red 144. Specific examples of the phthalocyanine pigments include copper phthalocyanine pigments such as C.I. Pigment Blue 15:6, and zinc phthalocyanine pigments such as C.I. Pigment Green 58.

Specific examples of the condensed polycyclic pigments include anthraquinone pigments such as C.I. Pigment Red 177, perylene pigments such as C.I. Pigment Red 123, perinone pigments such as C.I. Pigment Orange 43, quinacridone pigments such as C.I. Pigment Red 122, dioxazine pigments such as C.I. Pigment Violet 23, isoindolinone pigments such as C.I. Pigment Yellow 109, isoindoline pigments such as C.I. Pigment Orange 66, quinophthalone pigments such as C.I. Pigment Yellow 138, nickel azo complex pigments such as C.I. Pigment Yellow 150, indigo pigments such as C.I. Pigment Red 88, metal complex pigments such as C.I.

Pigment Green 8, and diketopyrrolopyrrole pigments such as C.I. Pigment Red 254, C.I. Pigment Red 255 and C.I. Pigment Orange 71.

Among these pigments, from the viewpoint of exhibiting the effects of the compound of the present invention in a more efficient manner, preferred are diketopyrrolopyrrole pigments represented by the following general formula (1).

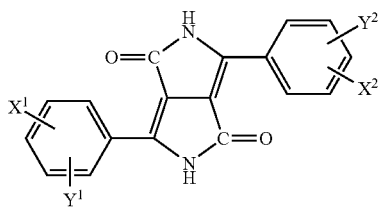

(1)

In the general formula (1), $X^1$ and $X^2$ are each independently a hydrogen atom or a halogen atom; and $Y^1$ and $Y^2$ are each independently a hydrogen atom or a —$SO_3H$ group. Meanwhile, the halogen atom is preferably a fluorine atom, a chlorine atom or a bromine atom.

Examples of suitable commercially available products of the diketopyrrolopyrrole pigments include C.I. Pigment Red 254 available from BASF SE, under the trade names of "Irgaphor Red B-CF", "Irgaphor Red BK-CF", "Irgaphor Red BT-CF", "Irgazin DPP Red BO", "Irgazin DPP Red BL", "Cromophtal DPP Red BP", "Cromophtal DPP Red BOC", etc.

From the viewpoint of a high brightness Y value, the pigment is desirably in the form of atomized particles preferably having an average primary particle size of 100 nm or less and more preferably from 20 to 60 nm. The average primary particle size of the pigment may be determined by the method in which the sizes of primary particles of the pigment are directly measured from an electron micrograph thereof. More specifically, minor axis diameters and major axis diameters of the individual primary particles are measured to obtain an average value thereof as a particle size of the particles. The volumes of 100 or more particles are respectively approximated to that of a cubic body having a side length equal to the thus obtained particle size to determine a volume-average particle size as the average primary particle size.

The above organic pigments may be used alone or in combination of any two or more thereof.

In addition, from the viewpoint of enhancing an affinity between the organic pigment and the ether-based organic solvent as well as a dispersibility and a storage stability of the obtained dispersion, there may also be used an organic pigment whose surface is previously treated with a resin, a polymer, a pigment derivative, etc.

[Ether-Based Organic Solvent]

The compound of the present invention is preferably used in combination with an organic solvent, from the viewpoint of enhancing a dispersibility of particles of a pigment, etc., in the resulting dispersion. Furthermore, for example, from the viewpoints of enhancing a compatibility with a binder component and the like used for color filters and satisfying both of good adhesion of the resulting cured film to a substrate and a good developing property, the compound of the present invention is more preferably used in combination with an ether-based organic solvent. In the following, the ether-based organic solvent is explained with respect to a pigment dispersion for color filters as an example.

The viscosity of the ether-based organic solvent as measured at 25° C. is preferably not less than 0.8 mPa·s, more preferably not less than 0.9 mPa·s, and still more preferably not less than 1.0 mPa·s, from the viewpoint of facilitated handling of the pigment dispersion, and is also preferably not more than 5.0 mPa·s, more preferably not more than 3.5 mPa·s, and still more preferably not more than 2.0 mPa·s, from the viewpoints of improving a contrast ratio of a cured film obtained using the pigment dispersion and attaining facilitated handling of the pigment dispersion.

The SP value of the ether-based organic solvent is preferably not less than 7.5, more preferably not less than 8.0, and still more preferably not less than 8.5, and is also preferably not more than 10.5, more preferably not more than 9.5, and still more preferably not more than 9.0, from the viewpoints of attaining an adequate affinity to a surface of the pigment and a low surface tension, enhancing a compatibility with a binder component and the like used for color filters, and improving a contrast ratio of a cured film obtained using the pigment dispersion. The SP value may be determined by Fedor method.

The boiling point of the ether-based organic solvent is preferably not lower than 50° C., more preferably not lower than 100° C., and still more preferably not lower than 120° C., from the viewpoint of a high safety of operation, and is also preferably not higher than 300° C., more preferably not higher than 260° C., and still more preferably not higher than 200° C., from the viewpoint of facilitated removal of the solvent upon drying the obtained coating film.

From the viewpoints of attaining an adequate affinity to a surface of the pigment, facilitated removal of the solvent upon drying the obtained coating film and a low surface tension, enhancing a compatibility with a binder component and the like used for color filters, and improving a contrast ratio of a cured film obtained using the pigment dispersion, the ether-based organic solvent is preferably a (poly)alkylene glycol monoalkyl ether acetate, a (poly)alkylene glycol monoalkyl ether propionate or a (poly)alkylene glycol dialkyl ether, and more preferably a (poly)alkylene glycol monoalkyl ether acetate. The "(poly)alkylene glycol" as used in the present specification means at least one compound selected from the group consisting of an alkylene glycol and a polyalkylene glycol.

Examples of the (poly)alkylene glycol monoalkyl ether acetate include ethylene glycol monomethyl ether acetate, ethylene glycol monoethyl ether acetate, ethylene glycol monobutyl ether acetate, propylene glycol monomethyl ether acetate (PGMEA), propylene glycol monoethyl ether acetate, diethylene glycol monomethyl ether acetate, diethylene glycol monoethyl ether acetate and diethylene glycol monobutyl ether acetate (BCA). Of these (poly)alkylene glycol monoalkyl ether acetates, from the viewpoints of a good dispersibility of the pigment therein, preferred are PGMEA (boiling point: 146° C.; viscosity at 25° C.: 1.1 mPa·s; SP value: 8.73) and BCA (boiling point: 247° C.; viscosity at 25° C.: 3.1 mPa·s; SP value: 8.94), and more preferred is PGMEA, from the viewpoints of facilitated handling of the pigment dispersion and a good workability.

Examples of the (poly)alkylene glycol monoalkyl ether propionate include ethylene glycol monomethyl ether propionate, ethylene glycol monoethyl ether propionate, propylene glycol monomethyl ether propionate and propylene glycol monoethyl ether propionate.

Examples of the (poly)alkylene glycol dialkyl ether include dipropylene glycol dimethyl ether and dipropylene glycol methyl propyl ether.

[Process for Producing Pigment Dispersion]

The compound of the present invention can be suitably used as a dispersant in a dispersion of particles of a pigment, etc. In the following, the process for producing a pigment dispersion used for color filters which includes a pigment and an ether-based organic solvent is explained as an example.

The process for producing a pigment dispersion preferably includes the following step from the viewpoint of producing a pigment dispersion for color filters which contains pigment particles having a small average particle size, has a low viscosity and is excellent in storage stability.

That is, the process for producing a pigment dispersion includes a step of mixing the dispersant containing the compound of the present invention, the pigment and the ether-based organic solvent to disperse the pigment therein.

As the mixing and dispersing device used for the above dispersing step, there may be used various known dispersers. For example, there may be used high-speed stirring mixers such as homomixers, kneading machines such as roll mills, kneaders and extruders, high-pressure dispersers such as high-pressure homogenizers, and media-type dispersers such as paint shakers and beads mills. These devices may be used in combination of any two or more thereof.

Of these devices, from the viewpoint of uniformly mixing the pigment in the ether-based organic solvent, preferred are high-speed stirring mixers such as homomixers, and media-type dispersers such as paint shakers and beads mills. Examples of the commercially available media-type dispersers include "Ultra Apex Mill" (available from Kotobuki Industries Co., Ltd.) and "Pico Mill" (available from Asada Iron Works Co., Ltd.).

As the material of the dispersing media when using the media-type dispersers in the dispersing step, there are preferably used ceramic materials such as zirconia and titania, polymer materials such as polyethylene and nylon, metals, etc. Of these materials, from the viewpoint of a good wear resistance, preferred is zirconia. In addition, from the viewpoint of deaggregating aggregated particles in the pigment, the diameter of the dispersing media used in the media-type dispersers is preferably not less than 0.003 mm, and more preferably not less than 0.01 mm, and is also preferably not more than 0.5 mm, and more preferably not more than 0.4 mm.

The time required for the dispersing step is preferably not less than 0.3 h, and more preferably not less than 1 h, from the viewpoint of atomizing the pigment to a sufficient extent, and is also preferably not more than 200 h, and more preferably not more than 50 h, from the viewpoint of producing the pigment dispersion with a high efficiency.

[Pigment Dispersion for Color Filters]

The pigment dispersion for color filters which is produced by the above process contains the compound of the present invention, the pigment and the organic solvent.

The content of the pigment in the pigment dispersion is preferably not less than 3% by mass, and more preferably not less than 5% by mass, from the viewpoint of attaining a good coloring property thereof, and is also preferably not more than 30% by mass, and more preferably not more than 20% by mass, from the viewpoint of attaining a low viscosity thereof.

The mass ratio of the compound of the present invention to the pigment in the pigment dispersion [compound of the present invention/pigment] is preferably not less than 0.2, more preferably not less than 0.3, and still more preferably not less than 0.4, and is also preferably not more than 1.5, more preferably not more than 1.2, and still more preferably not more than 1.0, from the viewpoint of improving a contrast ratio of the pigment dispersion.

The content of the solvent in the pigment dispersion is preferably from 20 to 95% by mass, and more preferably from 40 to 90% by mass, from the viewpoints of a good coloring property and a low viscosity of the dispersion.

The average particle size of the pigment in the pigment dispersion is preferably not more than 200 nm, more preferably from 20 to 100 nm, still more preferably from 20 to 90 nm, even still more preferably from 20 to 70 nm, and further even still more preferably from 20 to 60 nm, from the viewpoint of attaining a good contrast ratio of the dispersion as a coloring material for color filters.

Meanwhile, the average particle size may be measured by the method described in Examples below.

With respect to the aforementioned embodiments of the present invention, there are further described the following aspects concerning the compound, the dispersant, the process for producing the compound, and the use of the compound.

<1> A quaternary ammonium salt compound represented by the general formula (I):

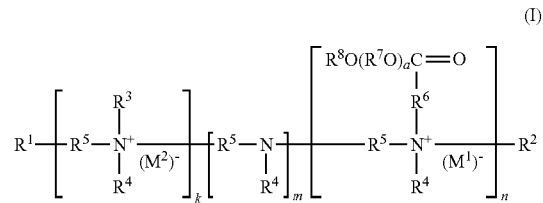

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; W is an alkanediyl group having not less than 1 and not more than 18 carbon atoms with the proviso that $R^5$ adjacent to W represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order.

<2> The quaternary ammonium salt compound according to the above aspect <1>, wherein the compound is represented by the general formula (I-1);

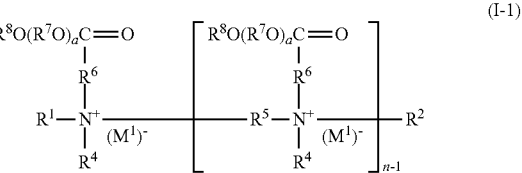

wherein $R^1$, $R^2$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ is an anion; n is an integer of not less than 2 and not more than 22; and if a plurality of ($R^7O$) groups are present, the groups may be the same or different from each other.

<3> The compound according to the above aspect <1> or <2>, wherein (n+m+k) is an integer of not more than 22, preferably an integer of not more than 11, more preferably an integer of not more than 7, and still more preferably an integer of not more than 4, and is also an integer of not less than 2, preferably 2 or 3, and more preferably 2.

<4> The compound according to any one of the above aspects <1> to <3>, wherein n is an integer of not more than 22, preferably an integer of not more than 11, more preferably an integer of not more than 7, still more preferably an integer of not more than 4, and further still more preferably an integer of not more than 3, and is also an integer of not less than 1, preferably an integer of not less than 2, more preferably 2 or 3, and still more preferably 2.

<5> The compound according to any one of the above aspects <1> to <4>, wherein m is an integer of not more than 21, preferably an integer of not more than 9, more preferably an integer of not more than 5, and still more preferably an integer of not more than 2, and is also an integer of not less than 0, more preferably 0 or 1, and still more preferably 0.

<6> The compound according to any one of the above aspects <1> to <5>, wherein m is preferably 1.

<7> The compound according to any one of the above aspects <1> to <6>, wherein k is an integer of not more than 21, preferably an integer of not more than 9, more preferably an integer of not more than 5, and still more preferably an integer of not more than 1, and is also an integer of not less than 0, preferably 0 or 1, and more preferably 0.

<8> The compound according to any one of the above aspects <1> to <7>, wherein $(n+m+k)_{av}$ as an average value of (n+m+k) is preferably not more than 10, more preferably not more than 5, and still more preferably not more than 3.2, and is also preferably not more than 2.5, and more preferably not more than 2.2.

<9> The compound according to any one of the above aspects <1> to <8>, wherein $(n+m+k)_{av}$ as an average value of (n+m+k) is preferably not less than 2.0, more preferably not less than 2.5, and still more preferably not less than 2.8.

<10> The compound according to any one of the above aspects <1> to <9>, wherein $n_{av}$ as an average value of n is preferably not more than 10, more preferably not more than 5, still more preferably not more than 3, even still more preferably not more than 2.5, and further even still more preferably not more than 2.2, and is also preferably not less than 1.0, more preferably not less than 1.5, still more preferably not less than 1.7, even still more preferably not less than 1.9, and further even still more preferably 2.

<11> The compound according to any one of the above aspects <1> to <10>, wherein $m_{av}$ as an average value of m is preferably not more than 9, more preferably not more than 3, and still more preferably not more than 1.3, and is also preferably not more than 0.5, and more preferably not more than 0.2.

<12> The compound according to any one of the above aspects <1> to <11>, wherein $m_{av}$ as an average value of m is preferably not less than 0, more preferably not less than 0.1, and still more preferably not less than 0.2.

<13> The compound according to any one of the above aspects <1> to <12>, wherein $k_{av}$ as an average value of k is preferably not more than 9, more preferably not more than 3, still more preferably not more than 1.2, even still more preferably not more than 0.5, and further even still more preferably not more than 0.2, and is also preferably not less than 0, and more preferably 0.

<14> The compound according to any one of the above aspects <1> to <13>, wherein a ratio of nay as an average value of n to $(n+m+k)_{av}$ as an average value of $(n+m+(n_{av}/(n+m+k)_{av})$ is preferably not less than 0.3, more preferably not less than 0.6, still more preferably not less than 0.8, and even still more preferably not less than 0.9, and is also preferably not more than 1.0, and more preferably 1.0.

<15> The compound according to any one of the above aspects <1> to <14>, wherein the number of carbon atoms of each of $R^1$, $R^2$ and $R^4$ is not more than 10, preferably not more than 8, still more preferably not more than 6, and even still more preferably 1.

<16> The compound according to any one of the above aspects <1> to <15>, wherein $R^1$, $R^2$ and $R^4$ are each preferably a hydrocarbon group that is substituted with no hydroxyl group.

<17> The compound according to any one of the above aspects <1> to <16>, wherein $R^1$, $R^2$ and $R^4$ are each preferably at least one group selected from the group consisting of a methyl group, an ethyl group, a butyl group, a hexyl group, a hydroxymethyl group, a hydroxybutyl group and a hydroxyhexyl group, more preferably at least one group selected from the group consisting of a methyl group and an ethyl group, and still more preferably a methyl group.

<18> The compound according to any one of the above aspects <1> to <17>, wherein the number of carbon atoms of the alkanediyl group as $R^5$ is not less than 1, preferably not less than 2, and more preferably not less than 3, and is also not more than 18, preferably not more than 14, more preferably not more than 10, and still more preferably not more than 6.

<19> The compound according to any one of the above aspects <1> to <18>, wherein the alkanediyl group as $R^5$ is preferably at least one group selected from the group consisting of a methylene group, an ethylene group, various propanediyl groups, various hexanediyl groups, various octanediyl groups and various nonanediyl groups, more preferably at least one group selected from the group consisting of a propane-1,3-diyl group, a hexane-1,6-diyl group and a nonane-1,9-diyl group, still more preferably at least one group selected from the group consisting of a propane-1,3-diyl group and a hexane-1,6-diyl group, and even still more preferably a hexane-1,6-diyl group.

<20> The compound according to any one of the above aspects <1> to <19>, wherein the number of carbon atoms of $R^6$ is not more than 4, preferably not more than 3, more preferably not more than 2, and still more preferably 1.

<21> The compound according to any one of the above aspects <1> to <20>, wherein $R^6$ is preferably a methylene group.

<22> The compound according to any one of the above aspects <1> to <21>, wherein the number of carbon atoms of $R^7$ is not more than 4, and preferably not more than 3, and is also not less than 2.

<23> The compound according to any one of the above aspects <1> to <22>, wherein $R^7$ is preferably at least one group selected from the group consisting of an ethylene group and a propylene group.

<24> The compound according to any one of the above aspects <1> to <23>, wherein ($R^7O$) preferably contains a structural unit derived from propyleneoxide, and more preferably contains a structural unit derived from ethyleneoxide and a structural unit derived from propyleneoxide.

<25> The compound according to any one of the above aspects <1> to <24>, wherein a is not less than 1, preferably not less than 15, more preferably not less than 21, still more preferably not less than 30, and even still more preferably not less than 40, and is also not more than 100, preferably not more than 95, more preferably not more than 70, and still more preferably not more than 50.

<26> The compound according to any one of the above aspects <1> to <25>, wherein ($R^7O$)$_a$ is a structural unit represented by the general formula (I-a):

$$*{-}(PO){-}_b{-}(EO){-}_c*$$ (I-a)

wherein PO is a propyleneoxide unit; EO is an ethyleneoxide unit; b and c represent average molar numbers of addition of PO and EO, respectively, and b is not less than 0 and not more than 100, and c is not less than 0 and not more than 100, with the proviso that (b c) is not less than 1 and not more than 100; and * represents a bonding site.

<27> The compound according to the above aspect <26>, wherein the structural unit represented by the general formula (I-a) is preferably in the form of a block polymer, and more preferably a diblock polymer.

<28> The compound according to the above aspect <26> or <27>, wherein a terminal end on a (PO) side of the general formula (I-a) is bonded to $R^8O$, whereas a terminal end on a (EO) side of the general formula (I-a) is bonded to a carbonyl group.

<29> The compound according to any one of the above aspects <26> to <28>, wherein b is preferably not less than 11, more preferably not less than 15, still more preferably not less than 21, and even still more preferably not less than 25, and is also preferably not more than 60, more preferably not more than 50, and still more preferably not more than 35.

<30> The compound according to any one of the above aspects <26> to <29>, wherein c is preferably not less than 1, more preferably not less than 5, still more preferably not less than 11, and even still more preferably not less than 15, and is also preferably not more than 95, preferably not more than 70, still preferably not more than 50, even still more preferably not more than 30, and further even still more preferably not more than 20.

<31> The compound according to any one of the above aspects <26> to <30>, wherein a sum of b and c (b c) is preferably not less than 15, more preferably not less than 21, still more preferably not less than 30, and even still more preferably not less than 40, and is also preferably not more than 95, more preferably not more than 70, and still more preferably not more than 50.

<32> The compound according to any one of the above aspects <26> to <31>, wherein a ratio of b to a sum of b and c (b/(b+c)) is preferably not less than 0.2, more preferably not less than 0.4, and still more preferably not less than 0.5, and is also preferably not more than 0.97, more preferably not more than 0.86, and still more preferably not more than 0.8.

<33> The compound according to any one of the above aspects <1> to <32>, wherein the number of carbon atoms of $R^8$ is not less than 1, preferably not less than 6, and more preferably not less than 10, and is also not more than 18, preferably not more than 16, more preferably not more than 14, and still more preferably not more than 12.

<34> The compound according to any one of the above aspects <1> to <33>, wherein $R^8$ is preferably at least one group selected from the group consisting of a methyl group, an ethyl group, a decyl group, a lauryl group, a myristyl group, a cetyl group, an oleyl group and a stearyl group, more preferably at least one group selected from the group consisting of a methyl group, a decyl group, a lauryl group, an oleyl group and a stearyl group, still more preferably at least one group selected from the group consisting of a decyl group and a lauryl group, and even still more preferably a lauryl group.

<35> The compound according to any one of the above aspects <1> to <34>, wherein the number of carbon atoms of $R^3$ is not more than 10, preferably not more than 7, more preferably not more than 4, and still more preferably not more than 2, and is also not less than 1.

<36> The compound according to any one of the above aspects <1> to <35>, wherein $R^3$ is at least one group selected from the group consisting of a methyl group, an ethyl group, a propyl group and a benzyl group, and preferably a methyl group.

<37> The compound according to any one of the above aspects <1> to <36>, wherein $(M^1)^-$ is preferably a halide ion, more preferably at least one anion selected from the group consisting of a chloride ion, a bromide ion and an iodide ion, and still more preferably a chloride ion.

<38> The compound according to any one of the above aspects <1> to <37>, wherein $(M^2)^-$ is preferably at least one anion selected from the group consisting of $CH_3SO_4^-$, $C_2H_5SO_4^-$ and $CH_3C_6H_4SO_3^-$, more preferably at least one anion selected from the group consisting of $CH_3SO_4^-$ and $C_2H_5SO_4^-$, and still more preferably $CH_3SO_4^-$, and $(M^2)^-$ is also preferably a halide ion, more preferably at least one anion selected from the group consisting of a chloride ion, a bromide ion and an iodide ion, and still more preferably a chloride ion.

<39> A dispersant including the compound according to any one of the above aspects <1> to <38>.

<40> A non-aqueous solvent-based dispersant including the compound according to any one of the above aspects <1> to <38>.

<41> A process for producing a quaternary ammonium salt compound represented by the general formula (I), including a step of reacting a halogenated alkyl ester compound represented by the general formula (II) with a polyamine compound represented by the general formula (III);

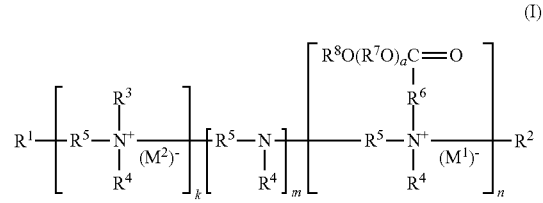

(I)

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms with the proviso that $R^5$ adjacent to $R^1$ represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order;

(II)

wherein $R^6$, $R^7$, $R^8$ and a are the same as defined above; and X is a halogen atom; and

(III)

wherein $R^1$, $R^2$, $R^4$, $R^5$ and (n+m+k) are the same as defined above.

<42> A use of the compound according to any one of the above aspects <1> to <38> for a dispersant.
<43> A use of the compound according to any one of the above aspects <1> to <38> for dispersing a pigment.
<44> A use of the compound according to any one of the above aspects <1> to <38> for dispersing a pigment in a non-aqueous solvent.
<45> The use according to the above aspect <43> or <44>, wherein the pigment is an organic pigment.
<46> The use according to the above aspect <44> or <45>, wherein the non-aqueous solvent is an ether-based organic solvent.

EXAMPLES

In the following Synthesis Examples, Examples and Comparative Examples, the numerical value X in the expression of "alkylene glycol (X)" is intended to mean an average molar number of addition of an alkyleneoxide in the alkylene glycol. Meanwhile, average molar numbers of addition of propyleneoxide (hereinafter also referred to merely as "PO") and ethyleneoxide (hereinafter also referred to merely as "EO") in the alkoxy polyalkylene glycol, and a weight-average molecular weight, a solid content and a reaction rate of each sample, as well as average values (n+m+k)ay, nay, may and $k_{av}$ of (n+m+k), n, m and k in the general formulae, were respectively measured by the following methods.

(1) Measurement of Average Molar Numbers of Addition of PO and EO in Alkoxy Polyalkylene Glycol Using an NMR measuring apparatus "Mercury 400 Model" available from Varian Inc., a sample prepared by esterifying an end hydroxyl group of an alkoxy polyalkylene glycol with trifluoroacetic acid was subjected to measurement of a proton nuclear magnetic resonance ($^1$H-NMR) spectrum (measuring conditions: non-decoupling method; relaxation time: 10 s; cumulative number: 32). A solution prepared by dissolving 0.01 g of the sample treated with trifluoroacetic acid in 0.99 g of deuterated chloroform was used in the above measurement, and average molar numbers of addition of PO and EO were calculated from the following formulae, respectively.

Average Molar Number of Addition of PO=(integrated value of signal derived from methyl group of polyoxypropylene)/(integrated value of signal derived from methylene group adjacent to trifluoroacetic acid ester group)/1.5

Average Molar Number of Addition of EO=(integrated value of signal derived from methyl group of polyoxyethylene)/(integrated value of signal derived from methylene group adjacent to trifluoroacetic acid ester group)/2

(2) Measurement of Weight-Average Molecular Weight

The weight-average molecular weight was measured either under the following <Conditions 1> or under the following <Conditions 2>.

A sample to be measured was prepared as follows. That is, a solution containing the compound obtained in the below-mentioned respective Production Examples was sampled in a glass bottle ("Screw Vial No. 5" available from Maruemu Corporation) in an amount of 0.05 g in terms of a solid content thereof, and then the following eluent was added to the glass bottle to control a total amount of contents of the glass bottle to 10 g, followed by closing the glass bottle with a cap. Successively, the contents of the glass bottle were stirred using a test tube mixer ("Minishaker MS1" available from IKA Co, Ltd.) at 2500 rpm for 1 min, and 100 μL of the resulting solution was used as the sample to be measured.

<Conditions 1>

Lithium bromide and acetic acid were dissolved in an ethanol/water mixed solvent (mass ratio: 8/2) such that concentrations of lithium bromide and acetic acid in the resulting solution were 50 mmol/L and 1% by mass, respectively, to prepare a solution as an eluent. The weight-average molecular weight of the compound was measured by gel chromatography [GPC apparatus "HLC-8320GPC" available from Tosoh Corporation; detector: differential refractometer (attachment to the apparatus); column: "TSK-GEL α-M"×2 available from Tosoh Corporation; flow rate: 0.6 mL/min; column temperature: 40° C.] using "Polymer Standard Polyethylene Glycols (having molecular weights of 100, 400, 1,500 and 6,500)" available from G.L. Science Co., Ltd., and "Standard Polyethyleneoxide (having molecular weights of 50,000, 250,000 and 900,000" available from Tosoh Corporation, as reference standard substances.

<Conditions 2>

Dimethyl dodecylamine ("FARMIN DM20" available from Kao Corporation) was dissolved in chloroform such that a concentrations of dimethyl dodecylamine in the resulting solution was 100 mmol/L to prepare a solution as an eluent. The weight-average molecular weight of the compound was measured by gel chromatography [GPC apparatus "HLC-8220 GPC" available from Tosoh Corporation; detector: differential refractometer (attachment to the apparatus); column: "K-804L" available from Showa Denko K.K.; flow rate: 1.0 mL/min; column temperature: 40° C.] using "Standard Polystyrenes (having molecular weights of 500, 3,600, 18,000, 96,000 and 420,000)" available from Tosoh Corporation, and "Polystyrene Standard (having a molecular weight of 49,000)" available from Pressure Chemical Co., as reference standard substances.

(3) Measurement of Solid Content

A petri dish was charged with 10 parts by mass of dried anhydrous sodium sulfate, a glass bar and 2 parts by mass of a sample, and the contents of the petri dish were mixed by the glass bar and then dried for 2 h using a vacuum dryer (under a pressure of 8 kPa) at 105° C. The mass of the contents of the petri dish after dried was measured to calculate a solid content of the sample according to the following formula.

Solid content (% by mass)=[(mass after dried (g))−
(total mass of petri dish, glass bar and dried
anhydrous sodium sulfate (g))]/(mass of sample
(g))×100

(4) Measurement of Reaction Rate
(On the Basis of Chlorine Ion Content)

A chlorine contained in an alkoxy polyalkylene glycol monochloroacetate was converted into a chlorine ion by the reaction. Therefore, the reaction rate based on a chlorine ion content was calculated according to the following formula.

Reaction rate (%)=[chlorine ion content (% by mass)]/
[total chlorine content (% by mass)]×100

In the above formula, the chlorine ion content is the value determined by Volhard method; and the total chlorine content is the value determined by Volhard method after decomposing the sample with sodium butyrate.
(On the Basis of Reduction in an Amine Value)

A polyamine was converted into a quaternary salt by the reaction with reduction in an amine value thereof. Therefore, the reaction rate on the basis of reduction in an amine value is calculated according to the following formula.

Reaction rate (%)=[(amine value before reaction
(mgKOH/g))−(amine value after reaction
(mgKOH/g))]/(amine value before reaction
(mgKOH/g))×100

The amine value was measured according to the "tertiary amine value" prescribed in ASTM D2073-66.
(5) Determination of Quaternarization Reaction Using an NMR measuring apparatus "Mercury 400 Model" available from Varian Inc., a polyamine compound and a halogenated alkyl ester compound as raw materials as well as a quaternarized product were subjected to measurement of a proton nuclear magnetic resonance ($^1$H-NMR) spectrum thereof (measuring conditions: non-decoupling method; relaxation time: 10 s; cumulative number: 32). A solution prepared by dissolving 0.01 g of each sample in 0.99 g of deuterated chloroform was used in the above measurement. Upon the measurement of the quaternarized product in Comparative Example 1, the sample from which methanol was removed was used therein, and deuterated methanol was used in place of deuterated chloroform.
(6) Measurement of Averages Values $(n+m+k)_{av}$, $n_{av}$, $m_{av}$ and $k_{av}$ of $(n+m+k)$, n, m and k in General Formula of Compound The average value $(n+m+k)_{av}$ was determined from an average amine molar number of the polyamine compound before the reaction (average value of $(n+m+k)$ in the general formula (III)). The average amine molar number was determined from an integration ratio of the results of $^1$H-NMR measurement of the polyamine compound. More specifically, in Synthesis Examples 13 and 14, the $^1$H-NMR measurement of the obtained polyamine compound was carried out by the same method as described in the above "Determination of Quaternarization Reaction", and the average value $(n+m+k)_{av}$ was calculated from a peak area (p) derived from hydrogen of a methylene group adjacent to an OH group of R$^1$ and R$^2$, and a peak area (q) derived from hydrogen of a methyl group bonded to N according to the following formula.

$(n+m+k)_{av}=(4×q)/(3×p)$

Meanwhile, in the case of using a polyamine compound having a single amine number in a molecule of the polyamine compound, the amine number was used as $(n+m+k)_{av}$.

The average values nay, $m_{av}$ and $k_{av}$ were determined from the above amine value after the reaction, and the below-mentioned amounts of $(M^1)^-$ and $(M^2)^-$.

The below-mentioned ratio of $n_{KOH}$, $M_{KOH}$ and $k_{KOH}$ was regarded as a ratio of nay, $m_{av}$ and $k_{av}$, and $n_{av}$, $m_{av}$ and $k_{av}$ were respectively calculated such that $(n_{av}+m_{av}+k_{av})$ was identical to the average amine molar number $(n+m+k)_{av}$ of the polyamine compound used for synthesis of the respective compounds in Examples, etc. Meanwhile, $n_{KOH}$ and $k_{KOH}$ mean the numbers of quaternary ammonium groups contained in structural units represented by n and k, respectively, as values calculated in terms of an amine value.

The value $n_{KOH}$ was calculated according to the following formula.

$n_{KOH}=\{[\text{amount of }(M^1)^-(\% \text{ by mass})]/(100×[\text{molecular weight of }(M^1)^-])\}×56×1{,}000$ The value $M_{KOH}$ was defined as an amine value (mgKOH/g) after the reaction.

The value $k_{KOH}$ was calculated according to the following formula.

$k_{KOH}=\{[\text{amount of }(M^2)^-(\% \text{ by mass})]/(100×[\text{molecular weight of }(M^2)^-])\}×56×1{,}000$ In the case where $(M^1)^-$ and $(M^2)^-$ are the amounts of $(M^1)^-$ and $(M^2)^-$ were respectively determined as the value of a chlorine concentration based on a solid content of the sample as measured by Volhard method.

In the other cases, the amounts of $(M^1)^-$ and $(M^2)^-$ were measured by the following method. That is, 0.1 g of a solution containing the respective compounds obtained in the below-mentioned Examples, etc., was diluted 1,000 to 5,000 times with ultrapure water to prepare a dilute solution containing a known concentration of the compound, and 25 μL of the resulting solution was used as a sample to be measured. The sample was measured by ion chromatography [apparatus: "Dionex ICS-2100" available from Thermo Fisher Scientific Inc.; suppressor: "ASRS-300"; detector: electric conductivity detector (attachment to the apparatus); detector temperature: 35° C.; column: "Ion Pac AS11-HC"+"Ion Pac AG11-HC" available from Nippon Dionex K.K.; flow rate: 1.5 mL/min; column temperature: 35° C.; eluent: potassium hydroxide solution]. The concentration of the eluent was adjusted to 10 mmol/L to 40 mmol/L (25 min) by linear gradient elution method. As the reference standard substance, there was used a sodium salt of $(M^1)^-$ or $(M^2)^-$. In addition, in Examples, etc., sodium methyl sulfate (reagent available from Tokyo Chemical Industry Co., Ltd.), sodium ethyl sulfate (reagent available from Tokyo Chemical Industry Co., Ltd.) or sodium p-toluenesulfonate (guaranteed reagent available from Wako Pure Chemical Industries, Ltd.) was used as the reference standard substance according to the respective compounds to be measured. The mass amount (% by mass) of $(M^1)^-$ or $(M^2)^-$ in the respective compounds was determined from the measurement results.

Synthesis Example 1

Synthesis of Methoxy Polypropylene Glycol (29) Polyethylene Glycol (15)

A 6.0 L-capacity autoclave equipped with a stirrer and a temperature controller was charged with 267 g (1.8 mol) of methyl propylene diglycol ("MFDG" available from Nippon Nyukazai Co., Ltd.) and 17.6 g of a 48% by mass potassium hydroxide aqueous solution, and after an inside atmosphere of the autoclave was purged with nitrogen, water was removed therefrom at 100° C. under 4.7 kPa for 1.0 h. After feeding nitrogen into the autoclave to return an inside pressure thereof to atmospheric pressure, the contents of the autoclave were heated to 110° C., and then while introducing 3,060 g (52.7 mol) of PO into the autoclave such that the inside pressure was adjusted to 0.1 to 0.45 MPa, the contents of the autoclave were subjected to addition reaction for 36 h. The contents of the autoclave were heated to 140° C., and then while introducing 1,300 g (29.5 mol) of EO into the autoclave such that the inside pressure was adjusted to 0.1 to 0.4 MPa, the contents of the autoclave were further subjected to addition reaction for 12 h. Thereafter, the contents of the autoclave were cooled to 60° C., and 7.6 g of glacial acetic acid (reagent available from Kishida Chemical Co, Ltd.) was added thereto, and the resulting mixture was stirred for 1 h, thereby obtaining 4,550 g of methoxy polypropylene glycol (29) polyethylene glycol (15).

Synthesis Example 2

Synthesis of Lauroxy Polypropylene Glycol (29) Polyethylene Glycol (15)

The same procedure as in Synthesis Example 1 was repeated except for using 375 g (2.0 mol) of lauryl alcohol ("KALCOL 2098" available from Kao Corporation) in place of 267 g (1.8 mol) of methyl propylene diglycol ("MFDG" available from Nippon Nyukazai Co., Ltd.), and changing the amount of the 48% by mass potassium hydroxide aqueous solution from 17.6 g to 12.4 g, the amount of PO from 3,060 g (52.7 mol) to 3,694 g (63.6 mol), the amount of EO from 1,300 g (29.5 mol) to 1,405 g (31.9 mol), and the amount of glacial acetic acid from 7.6 g to 5.3 g, respectively, thereby obtaining 5,400 g of lauroxy polypropylene glycol (29) polyethylene glycol (15).

Synthesis Example 3

Synthesis of Lauroxy Polypropylene Glycol (29)

The same procedure as in Synthesis Example 1 was repeated except for using 375 g (2.0 mol) of lauryl alcohol ("KALCOL 2098" available from Kao Corporation) in place of 267 g (1.8 mol) of methyl propylene diglycol ("MFDG" available from Nippon Nyukazai Co., Ltd.), changing the amount of the 48% by mass potassium hydroxide aqueous solution from 17.6 g to 12.4 g, the amount of PO from 3,060 g (52.7 mol) to 3,694 g (63.6 mol), and the amount of glacial acetic acid from 7.6 g to 5.3 g, respectively, and further conducting no EO addition reaction, thereby obtaining 4,002 g of lauroxy polypropylene glycol (29).

Synthesis Example 4

Synthesis of Lauroxy Polypropylene Glycol (15) Polyethylene Glycol (29)

The same procedure as in Synthesis Example 1 was repeated except for using 375 g (2.0 mol) of lauryl alcohol ("KALCOL 2098" available from Kao Corporation) in place of 267 g (1.8 mol) of methyl propylene diglycol ("MFDG" available from Nippon Nyukazai Co., Ltd.), changing the amount of the 48% by mass potassium hydroxide aqueous solution from 17.6 g to 12.4 g, the amount of PO from 3,060 g (52.7 mol) to 1,766 g (30.4 mol), the amount of EO from 1,300 g (29.5 mol) to 2,810 g (63.8 mol), and the amount of glacial acetic acid from 7.6 g to 5.3 g, respectively, and further changing the PO addition time from 36 h to 14 h and the EO addition time from 12 h to 25 h, thereby obtaining 4,896 g of lauroxy polypropylene glycol (15) polyethylene glycol (29).

Synthesis Example 5

Synthesis of Methoxy Polypropylene Glycol (29) Polyethylene Glycol (15) Monochloroacetate A 3 L-capacity four-necked flask equipped with a stirrer, a thermometer, a nitrogen blowing tube and a cooling tube was charged with 1,550 g of the methoxy polypropylene glycol (29) polyethylene glycol (15) obtained in Synthesis Example 1, 83.3 g of monochloroacetic acid (guaranteed reagent available from Wako Pure Chemical Industries, Ltd.) and 11.1 g of p-toluenesulfonic acid monohydrate (guaranteed reagent available from Kishida Chemical Co., Ltd.), and while stirring the contents of the flask, an inside atmosphere of the flask was purged with nitrogen. The contents of the flask were heated to 140° C., and then while blowing nitrogen into the flask and maintaining an inside of the flask under reduced pressure (−0.1 MPa) using a vacuum pump ("BSW-50" available from Sato Vac Inc.) connected to the cooling tube, the contents of the flask were reacted for 16 h. After the contents of the flask were cooled to 80° C., 50.6 g of anhydrous sodium carbonate (guaranteed reagent available from Kishida Chemical Co., Ltd.) was added to the flask, and the resulting mixture was stirred for 2 h. The resulting reaction solution was subjected to filtration using a filter paper ("No. 5A" available from ADVANTEC Toyo Co., Ltd.), thereby obtaining 1,232 g of methoxy polypropylene glycol (29) polyethylene glycol (15) monochloroacetate.

Synthesis Example 6

Synthesis of Lauroxy Polypropylene Glycol (29) Polyethylene Glycol (15) Monochloroacetate The same procedure as in Synthesis Example 5 was repeated except for using 653 g of the lauroxy polypropylene glycol (29) polyethylene glycol (15) obtained in Synthesis Example 2 in place of 1,550 g of the methoxy polypropylene glycol (29) polyethylene glycol (15), and changing the amount of monochloroacetic acid from 83.3 g to 35.1 g, the amount of p-toluenesulfonic acid monohydrate from 11.1 g to 3.5 g, and the amount of anhydrous sodium carbonate from 50.6 g to 26.8 g, respectively, thereby obtaining 526 g of lauroxy polypropylene glycol (29) polyethylene glycol (15) monochloroacetate.

Synthesis Example 7

Synthesis of Methoxy Polyethylene Glycol (23) Monochloroacetate

The same procedure as in Synthesis Example 5 was repeated except for using 447 g of methoxy polyethylene glycol (23) (reagent available from Alfa Aesar) in place of 1,550 g of the methoxy polypropylene glycol (29) polyethylene glycol (15), and changing the amount of monochloroacetic acid from 83.3 g to 48.4 g, the amount of p-toluenesulfonic acid monohydrate from 11.1 g to 0.5 g, and the amount of anhydrous sodium carbonate from 50.6 g to 57.0 g, respectively, thereby obtaining 379 g of methoxy polyethylene glycol (23) monochloroacetate.

Synthesis Example 8

Synthesis of Methoxy Polyethylene Glycol (45) Monochloroacetate

The same procedure as in Synthesis Example 5 was repeated except for using 463 g of methoxy polyethylene glycol (45) (reagent available from Sigma-Aldrich) in place of 1,550 g of the methoxy polypropylene glycol (29) polyethylene glycol (15), and changing the amount of monochloroacetic acid from 83.3 g to 33.5 g, the amount of p-toluenesulfonic acid monohydrate from 11.1 g to 2.6 g, and the amount of anhydrous sodium carbonate from 50.6 g to 40.0 g, respectively, thereby obtaining 352 g of methoxy polyethylene glycol (45) monochloroacetate.

Synthesis Example 9

Synthesis of Methoxy Polyethylene Glycol (90) Monochloroacetate

The same procedure as in Synthesis Example 5 was repeated except for using 464 g of methoxy polyethylene glycol (90) methacrylate ("BLEMMER PME-4000" available from NOF Corporation) in place of 1,550 g of the methoxy polypropylene glycol (29) polyethylene glycol (15), and changing the amount of monochloroacetic acid from 83.3 g to 16.8 g, the amount of p-toluenesulfonic acid monohydrate from 11.1 g to 1.3 g, and the amount of anhydrous sodium carbonate from 50.6 g to 20.0 g, respectively, thereby obtaining 315 g of methoxy polyethylene glycol (90) monochloroacetate.

Synthesis Example 10

Synthesis of Oleyloxy Polyethylene Glycol (60) Monochloroacetate

The same procedure as in Synthesis Example 5 was repeated except for using 654 g of oleyloxy polyethylene glycol (60) ("BLAUNON EN-1560" available from Aoki Oil Industrial Co., Ltd.) in place of 1,550 g of the methoxy polypropylene glycol (29) polyethylene glycol (15), and changing the amount of monochloroacetic acid from 83.3 g to 28.7 g, the amount of p-toluenesulfonic acid monohydrate from 11.1 g to 2.9 g, and the amount of anhydrous sodium carbonate from 50.6 g to 92.6 g, respectively, thereby obtaining 534 g of oleyloxy polyethylene glycol (60) monochloroacetate.

Synthesis Example 11

Synthesis of Lauroxy Polypropylene Glycol (29) Monochloroacetate

The same procedure as in Synthesis Example 5 was repeated except for using 458 g of the lauroxy polypropylene glycol (29) obtained in Synthesis Example 3 in place of 1,550 g of the methoxy polypropylene glycol (29) polyethylene glycol (15), and changing the amount of monochloroacetic acid from 83.3 g to 35.7 g, the amount of p-toluenesulfonic acid monohydrate from 11.1 g to 2.8 g, and the amount of anhydrous sodium carbonate from 50.6 g to 47.0 g, respectively, thereby obtaining 387 g of lauroxy polypropylene glycol (29) monochloroacetate.

Synthesis Example 12

Synthesis of Lauroxy Polypropylene Glycol (15) Polyethylene Glycol (29) Monochloroacetate The same procedure as in Synthesis Example 5 was repeated except for using 450 g of the lauroxy polypropylene glycol (15) polyethylene glycol (29) obtained in Synthesis Example 4 in place of 1,550 g of the methoxy polypropylene glycol (29) polyethylene glycol (15), and changing the amount of monochloroacetic acid from 83.3 g to 28.5 g, the amount of p-toluenesulfonic acid monohydrate from 11.1 g to 2.7 g, and the amount of anhydrous sodium carbonate from 50.6 g to 49.5 g, respectively, thereby obtaining 397 g of lauroxy polypropylene glycol (15) polyethylene glycol (29) monochloroacetate.

Synthesis Example 13

Synthesis of Poly-Tert-Amine Glycol (Compound of the General Formula (III) in which (n+m+k) is 4)

A 1 L-capacity flask equipped with a condenser and a separator for separating a reaction water produced was charged with 600 g of 1,6-hexanediol and 12 g of a Cu—Ni catalyst ("MX-2141" available from Kao Corporation). While stirring, an inside of the reaction system was purged with nitrogen, and heating of the contents of the flask was initiated. Simultaneously with initiation of the heating, a hydrogen gas was blown into the reaction system at a flow rate of 30 L/h, and the contents of the flask were heated 185° C. over about 40 min. After reaching 185° C., monomethylamine was blown into the reaction system at a flow rate of 22 L/h, and the contents of the flask were heated 195° C. over about 10 min. The contents of the flask were reacted at 195° C. for 6.0 h. After completion of the reaction, feed of the monomethylamine was stopped, and the reaction was continued for 1 h while feeding hydrogen only. The resulting reaction product was cooled and filtered, thereby obtaining a poly-tert-amine glycol represented by the following formula (s1) (as a compound of the general formula (III) in which (n+m+k) is 4). The average amine molar number of the thus obtained poly-tert-amine glycol was 3.7. Meanwhile, in the formula (s1), 3 as the number of the repeating units containing an amino group is a central value.

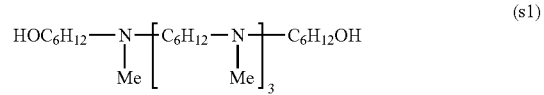

Synthesis Example 14

Synthesis of Poly-Tert-Amine Glycol (Compound of the General Formula (III) in which (n+m+k) is 9)

The same procedure as in Synthesis Example 13 was repeated except for the reaction time was changed from 6.0 h to 7.5 h, thereby obtaining a poly-tert-amine glycol represented by the following formula (s2) (as a compound of the general formula (III) in which (n+m+k) is 9). The average amine molar number of the thus obtained poly-tert-amine glycol was 9.3. Meanwhile, in the formula (s2), 8 as the number of the repeating units containing an amino group is a central value.

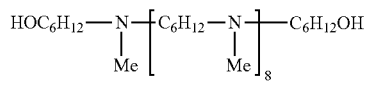
(s2)

Example 1

Synthesis of Compound (1) (Quaternarized Product of N,N,N',N'-Tetramethyl Hexanediamine with Methoxy Polypropylene Glycol (29) Polyethylene Glycol (15) Monochloroacetate)

A separable flask equipped with a reflux condenser, a thermometer, a nitrogen inlet tube and a stirrer was charged with 80 g of the methoxy polypropylene glycol (29) polyethylene glycol (15) monochloroacetate obtained in Synthesis Example 5, and 3.4 g of N,N,N',N'-tetramethyl hexanediamine ("KAOLIZER No. 1" available from Kao Corporation), and then an inside of the flask was purged with nitrogen. While stirring at 80° C., the contents of the flask were reacted for 20 h. After adding 120 g of propylene glycol monomethyl ether acetate (PGMEA) into the flask, the contents of the flask were stirred for 1 h and then cooled, thereby obtaining a PGMEA solution of a compound (1) (a quaternarized product of N,N,N',N'-tetramethyl hexanediamine with methoxy polypropylene glycol (29) polyethylene glycol (15) monochloroacetate). The thus obtained solution had a solid content of 43.5% by mass, and the resulting product had a weight-average molecular weight of 3,800 (as a measured value under <Conditions 1>).

The reaction rate as determined from a ratio of a chlorine ion content to a total chlorine content in the reaction solution was 94 mol %, and the reaction rate as determined from reduction in an amine value in the reaction solution was 96 mol %, and $n_{av}$ was 1.9, $m_{av}$ was 0.1, and $k_{av}$ was 0.0. As a result of the NMR measurement, it was confirmed that the signals derived from the methyl group and the methylene group bonded to N of N,N,N',N'-tetramethyl hexanediamine were shifted from 2.2 ppm to 3.1 ppm and 3.9 ppm, respectively, by the reaction, and the signal derived from the methylene group located apart by further one position from N and the signal derived from the methylene group located apart by further two positions from N were shifted from 1.5 ppm and 1.4 ppm to 2.0 ppm and 1.5 ppm, respectively. In addition, it was confirmed that the signal derived from the methylene group to which chlorine of the methoxy polypropylene glycol (29) polyethylene glycol (15) monochloroacetate was bonded, was shifted from 4.1 ppm to 4.9 ppm by the reaction.

That is, the compound (1) obtained in this Example was the compound represented by the following formula (e1). In the formula (e1), the methyl group (a) corresponds to $R^1$ in the general formula (I), and the bond (b) corresponds to $R^5$ (i.e., a single bond) adjacent to IV in the general formula (I).

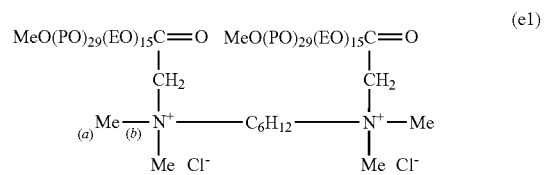
(e1)

Example 2

Synthesis of Compound (2) (Quaternarized Product of N,N,N',N'-Tetramethyl Propanediamine with Methoxy Polypropylene Glycol (29) Polyethylene Glycol (15) Monochloroacetate)

The same procedure as in Example 1 was repeated except for using 2.5 g of N,N,N',N'-tetramethyl propanediamine ("KAOLIZER No. 2" available from Kao Corporation) in place of 3.4 g of N,N,N',N'-tetramethyl hexanediamine ("KAOLIZER No. 1" available from Kao Corporation), thereby obtaining a PGMEA solution of a compound (2) (a quaternarized product of N,N,N',N'-tetramethyl propanediamine with methoxy polypropylene glycol (29) polyethylene glycol (15) monochloroacetate). The thus obtained solution had a solid content of 42.1% by mass, and the resulting product had a weight-average molecular weight of 3,800 (as a measured value under <Conditions 1>).

The reaction rate as determined from a ratio of a chlorine ion content to a total chlorine content in the reaction solution was 94 mol %, and the reaction rate as determined from reduction in an amine value in the reaction solution was 94 mol %, and $n_{av}$ was 1.9, $m_{av}$ was 0.1, and $k_{av}$ was 0.0. As a result of the NMR measurement, it was confirmed that the signals derived from the methyl group and the methylene group bonded to N of N,N,N',N'-tetramethyl propanediamine were shifted from 2.2 ppm and 2.3 ppm to 3.0 ppm and 4.0 ppm, respectively, by the reaction, and the signal derived from the methylene group located apart by further one position from N was shifted from 1.6 ppm to 2.8 ppm. In addition, it was confirmed that the signal derived from the methylene group to which chlorine of the methoxy polypropylene glycol (29) polyethylene glycol (15) monochloroacetate was bonded, was shifted from 4.1 ppm to 4.9 ppm by the reaction.

That is, the compound (2) obtained in this Example was the compound represented by the following formula (e2). In the formula (e2), the methyl group (a) corresponds to $R^1$ in the general formula (I), and the bond (b) corresponds to $R^5$ (i.e., a single bond) adjacent to $R^1$ in the general formula (I).

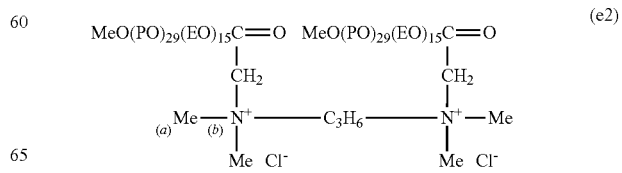
(e2)

Example 3

Synthesis of Compound (3) (Quaternarized Product of Poly-Tert-Amine Glycol with Methoxy Polypropylene Glycol (29) Polyethylene Glycol (15) Monochloroacetate (Compound of the General Formula (I) in which n/m/k is 4/0/0))

The same procedure as in Example 1 was repeated except for using 5.9 g of the poly-tert-amine glycol (average amine molar number: 3.7) obtained in Synthesis Example 13 in place of 3.4 g of N,N,N',N'-tetramethyl hexanediamine ("KAOLIZER No. 1" available from Kao Corporation), thereby obtaining a PGMEA solution of a compound (3) (a quaternarized product of the poly-tert-amine glycol with methoxy polypropylene glycol (29) polyethylene glycol (15) monochloroacetate (a compound of the general formula (I) in which n/m/k is 4/0/0)). The thus obtained solution had a solid content of 41.3% by mass, and the resulting product had a weight-average molecular weight of 24,000 (as a measured value under <Conditions 1>).

The reaction rate as determined from a ratio of a chlorine ion content to a total chlorine content in the reaction solution was 100 mol %, and the reaction rate as determined from reduction in an amine value in the reaction solution was 98 mol %, and $n_{av}$ was 3.6, $m_{av}$ was 0.1, and $k_{av}$ was 0.0. As a result of the NMR measurement, it was confirmed that the signals derived from the methyl group and the methylene group bonded to N of the poly-tert-amine glycol (average amine molar number: 3.7) were shifted from 2.2 ppm and 2.3 ppm to 3.1 ppm and 3.8 ppm, respectively, by the reaction, and the signal derived from the methylene group located apart by further one position from N and the signal derived from the methylene group located apart by further two positions from N were shifted from 1.5 ppm and 1.3 ppm to 1.9 ppm and 1.5 ppm, respectively. In addition, it was confirmed that the signal derived from the methylene group to which chlorine of the methoxy polypropylene glycol (29) polyethylene glycol (15) monochloroacetate was bonded, was shifted from 4.1 ppm to 4.6 ppm by the reaction.

That is, the compound (3) obtained in this Example was the compound represented by the following formula (e3). Meanwhile, in the formula (e3), 3 as the number of the repeating units containing a cationic group is a central value. In the formula (e3), the methyl group (a) corresponds to $R^1$ in the general formula (I), and the bond (b) corresponds to $R^6$ (i.e., a single bond) adjacent to $R^1$ in the general formula (I).

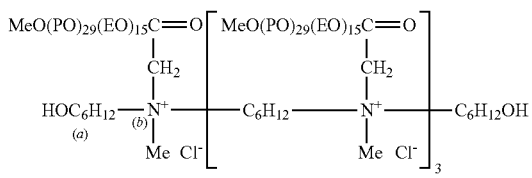

(e3)

Example 4

Synthesis of Compound (4) (Quaternarized Product of Poly-Tert-Amine Glycol with Methoxy Polypropylene Glycol (29) Polyethylene Glycol (15) Monochloroacetate (Compound of the General Formula (I) in which n/m/k is 9/0/0))

The same procedure as in Example 1 was repeated except for using 4.7 g of the poly-tert-amine glycol (average amine molar number: 9.3) obtained in Synthesis Example 14 in place of 3.4 g of N,N,N',N'-tetramethyl hexanediamine ("KAOLIZER No. 1" available from Kao Corporation), thereby obtaining a PGMEA solution of a compound (4) (a quaternarized product of the poly-tert-amine glycol with methoxy polypropylene glycol (29) polyethylene glycol (15) monochloroacetate (a compound of the general formula (I) in which n/m/k is 9/0/0)). The thus obtained solution had a solid content of 40.3% by mass, and the weight-average molecular weight of the resulting product was not measurable since the product was undissolved in the eluent.

The reaction rate as determined from a ratio of a chlorine ion content to a total chlorine content in the reaction solution was 87 mol %, and the reaction rate as determined from reduction in an amine value in the reaction solution was 97 mol %, and $n_{av}$ was 9.0, $m_{av}$ was 0.3, and $k_{av}$ was 0.0. As a result of the NMR measurement, it was confirmed that the signals derived from the methyl group and the methylene group bonded to N of the poly-tert-amine glycol (average amine molar number: 9.3) were shifted from 2.2 ppm and 2.3 ppm to 3.1 ppm and 3.8 ppm, respectively, by the reaction, and the signal derived from the methylene group located apart by further one position from N and the signal derived from the methylene group located apart by further two positions from N were shifted from 1.5 ppm and 1.3 ppm to 1.9 ppm and 1.5 ppm, respectively. In addition, it was confirmed that the signal derived from the methylene group to which chlorine of the methoxy polypropylene glycol (29) polyethylene glycol (15) monochloroacetate was bonded, was shifted from 4.1 ppm to 4.6 ppm by the reaction.

That is, the compound (4) obtained in this Example was the compound represented by the following formula (e4). Meanwhile, in the formula (e4), 8 as the number of the repeating units containing a cationic group is a central value. In the formula (e4), the methyl group (a) corresponds to $R^1$ in the general formula (I), and the bond (b) corresponds to $R^5$ (i.e., a single bond) adjacent to $R^1$ in the general formula (I).

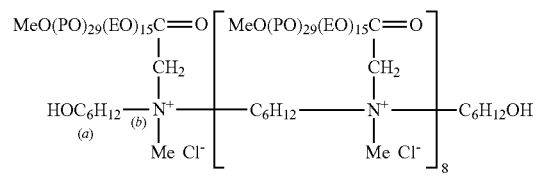

(e4)

Example 5

Synthesis of Compound (5) (Quaternarized Product of N,N,N',N'-Tetramethyl Hexanediamine with Lauroxy Polypropylene Glycol (29) Polyethylene Glycol (15) Monochloroacetate)

The same procedure as in Example 1 was repeated except for using 100 g of the lauroxy polypropylene glycol (29) polyethylene glycol (15) monochloroacetate obtained in Synthesis Example 6 in place of 80 g of the methoxy polypropylene glycol (29) polyethylene glycol (15) monochloroacetate, and changing the amount of N,N,N',N'-tetramethyl hexanediamine from 3.4 g to 3.2 g, and the amount of PGMEA from 120 g to 130 g, thereby obtaining a PGMEA solution of a compound (5) (a quaternarized product of N,N,N',N'-tetramethyl hexanediamine with lauroxy polypropylene glycol (29)

polyethylene glycol (15) monochloroacetate). The thus obtained solution had a solid content of 41.5% by mass, and the resulting product had a weight-average molecular weight of 7,600 (as a measured value under <Conditions 2>).

The reaction rate as determined from a ratio of a chlorine ion content to a total chlorine content in the reaction solution was 94 mol %, and the reaction rate as determined from reduction in an amine value in the reaction solution was 98 mol %, and $n_{av}$ was 2.0, $m_{av}$ was 0.0, and $k_{av}$ was 0.0. As a result of the NMR measurement, it was confirmed that the signals derived from the methyl group and the methylene group bonded to N of N,N,N',N'-tetramethyl hexanediamine were shifted from 2.2 ppm to 3.1 ppm and 3.9 ppm, respectively, by the reaction, and the signal derived from the methylene group located apart by further one position from N and the signal derived from the methylene group located apart by further two positions from N were shifted from 1.5 ppm and 1.4 ppm to 2.0 ppm and 1.5 ppm, respectively. In addition, it was confirmed that the signal derived from the methylene group to which chlorine of the lauroxy polypropylene glycol (29) polyethylene glycol (15) monochloroacetate was bonded, was shifted from 4.1 ppm to 4.8 ppm by the reaction.

That is, the compound (5) obtained in this Example was the compound represented by the following formula (e5). In the formula (e5), the methyl group (a) corresponds to $R^1$ in the general formula (I), and the bond (b) corresponds to $R^5$ (i.e., a single bond) adjacent to $R^1$ in the general formula W.

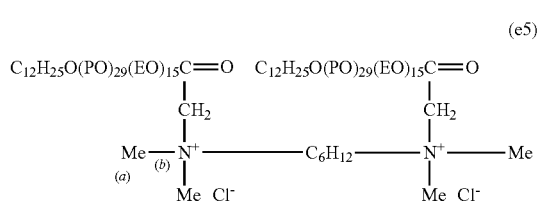

(e5)

Example 6

Synthesis of Compound (6) (Quaternarized Product of N,N,N',N'-Tetramethyl Propanediamine with Lauroxy Polypropylene Glycol (29) Polyethylene Glycol (15) Monochloroacetate)

The same procedure as in Example 1 was repeated except for using 254 g of the lauroxy polypropylene glycol (29) polyethylene glycol (15) monochloroacetate obtained in Synthesis Example 6 in place of 80 g of the methoxy polypropylene glycol (29) polyethylene glycol (15) monochloroacetate, and 6.4 g of N,N,N',N'-tetramethyl propanediamine ("KAOLIZER No. 2" available from Kao Corporation) in place of 3.4 g of N,N,N',N'-tetramethyl hexanediamine, and changing the amount of PGMEA from 120 g to 385 g, thereby obtaining a PGMEA solution of a compound (6) (a quaternarized product of N,N,N',N'-tetramethyl propanediamine with lauroxy polypropylene glycol (29) polyethylene glycol (15) monochloroacetate). The thus obtained solution had a solid content of 39.4% by mass, and the resulting product had a weight-average molecular weight of 4,000 (as a measured value under <Conditions 1>).

The reaction rate as determined from a ratio of a chlorine ion content to a total chlorine content in the reaction solution was 93 mol %, and the reaction rate as determined from reduction in an amine value in the reaction solution was 99 mol %, and $n_{av}$ was 2.0, $m_{av}$ was 0.0, and $k_{av}$ was 0.0. As a result of the NMR measurement, it was confirmed that the signals derived from the methyl group and the methylene group bonded to N of N,N,N',N'-tetramethyl propanediamine were shifted from 2.2 ppm and 2.3 ppm to 3.0 ppm and 4.0 ppm, respectively, by the reaction, and the signal derived from the methylene group located apart by further one position from N was shifted from 1.6 ppm to 2.8 ppm. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

That is, the compound (6) obtained in this Example was the compound represented by the following formula (e6). In the formula (e6), the methyl group (a) corresponds to $R^1$ in the general formula (I), and the bond (b) corresponds to $R^5$ (i.e., a single bond) adjacent to $R^1$ in the general formula (I).

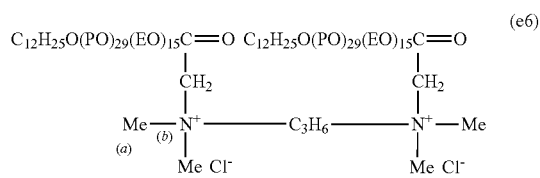

(e6)

Example 7

Synthesis of Compound (7) (Quaternarized Product of N,N,N',N'-Tetramethyl Nonanediamine with Lauroxy Polypropylene Glycol (29) Polyethylene Glycol (15) Monochloroacetate)

The same procedure as in Example 1 was repeated except for using 90 g of the lauroxy polypropylene glycol (29) polyethylene glycol (15) monochloroacetate obtained in Synthesis Example 6 in place of 80 g of the methoxy polypropylene glycol (29) polyethylene glycol (15) monochloroacetate, and 4.0 g of N,N,N',N'-tetramethyl nonanediamine in place of 3.4 g of N,N,N',N'-tetramethyl hexanediamine ("KAOLIZER No. 1" available from Kao Corporation), and changing the amount of PGMEA from 120 g to 125 g, thereby obtaining a PGMEA solution of a compound (7) (a quaternarized product of N,N,N',N'-tetramethyl nonanediamine with lauroxy polypropylene glycol (29) polyethylene glycol (15) monochloroacetate). The thus obtained solution had a solid content of 43.8% by mass, and the resulting product had a weight-average molecular weight of 4,000 (as a measured value under <Conditions 1>). Meanwhile, the N,N,N',N'-tetramethyl nonanediamine was synthesized by the method as described in paragraph [0021] of JP 7-90040A.

The reaction rate as determined from a ratio of a chlorine ion content to a total chlorine content in the reaction solution was 97 mol %, and the reaction rate as determined from reduction in an amine value in the reaction solution was 100 mol %, and $n_{av}$ was 2.0, $m_{av}$ was 0.0, and $k_{av}$ was 0.0. As a result of the NMR measurement, it was confirmed that the signals derived from the methyl group and the methylene group bonded to N of N,N,N',N'-tetramethyl nonanediamine were shifted from 2.2 ppm to 3.0 ppm and 3.9 ppm, respectively, by the reaction, and the signal derived from the methylene group located apart by further one position from N and the signal derived from the methylene group located apart by further two positions from N were shifted from 1.4 ppm and 1.3 ppm to 1.8 ppm and 1.4 ppm, respectively. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

That is, the compound (7) obtained in this Example was the compound represented by the following formula (e7). In the formula (e7), the methyl group (a) corresponds to $R^1$ in the general formula (I), and the bond (b) corresponds to $R^5$ (i.e., a single bond) adjacent to $R^1$ in the general formula (I).

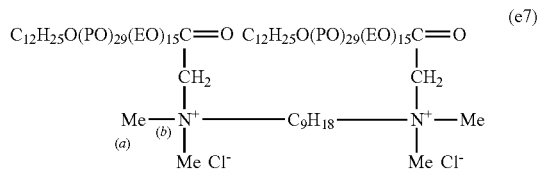

(e7)

Example 8

Synthesis of Compound (8) (Quaternarized Product of N,N,N',N'-Tetramethyl Hexanediamine with Methoxy Polyethylene Glycol (23) Monochloroacetate)

The same procedure as in Example 1 was repeated except for using 162 g of the methoxy polyethylene glycol (23) monochloroacetate obtained in Synthesis Example 7 in place of 80 g of the methoxy polypropylene glycol (29) polyethylene glycol (15) monochloroacetate, and changing the amount of N,N,N',N'-tetramethyl hexanediamine from 3.4 g to 9.6 g, and the amount of PGMEA from 120 g to 0 g, thereby obtaining a compound (8) (a quaternarized product of N,N,N',N'-tetramethyl hexanediamine with methoxy polyethylene glycol (23) monochloroacetate). The thus obtained compound had a solid content of 100% by mass and a weight-average molecular weight of 2,000 (as a measured value under <Conditions 1>).

The reaction rate as determined from a ratio of a chlorine ion content to a total chlorine content in the reaction solution was 95 mol %, and the reaction rate as determined from reduction in an amine value in the reaction solution was 98 mol %, and $n_{av}$ was 2.0, $m_{av}$ was 0.0, and $k_{av}$ was 0.0. As a result of the NMR measurement, it was confirmed that the signals derived from the methyl group and the methylene group bonded to N of N,N,N',N'-tetramethyl hexanediamine were shifted from 2.2 ppm to 3.1 ppm and 3.9 ppm, respectively, by the reaction, and the signal derived from the methylene group located apart by further one position from N and the signal derived from the methylene group located apart by further two positions from N were shifted from 1.5 ppm and 1.4 ppm to 2.0 ppm and 1.5 ppm, respectively. In addition, it was confirmed that the signal derived from the methylene group to which chlorine of the methoxy polyethylene glycol (23) monochloroacetate was bonded, was shifted from 4.1 ppm to 4.7 ppm by the reaction. FIG. 1 shows an NMR chart of the compound (8).

That is, the compound (8) obtained in this Example was the compound represented by the following formula (e8). In the formula (e8), the methyl group (a) corresponds to $R^1$ in the general formula (I), and the bond (b) corresponds to $R^5$ (i.e., a single bond) adjacent to $R^1$ in the general formula (I).

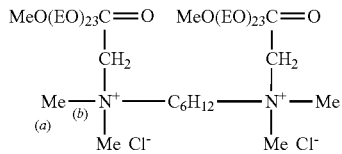

(e8)

Example 9

Synthesis of Compound (9) (Quaternarized Product of N,N,N',N'-Tetramethyl Hexanediamine with Methoxy Polyethylene Glycol (45) Monochloroacetate)

The same procedure as in Example 1 was repeated except for using 70 g of the methoxy polyethylene glycol (45) monochloroacetate obtained in Synthesis Example 8 in place of 80 g of the methoxy polypropylene glycol (29) polyethylene glycol (15) monochloroacetate, and changing the amount of N,N,N',N'-tetramethyl hexanediamine from 3.4 g to 3.5 g, thereby obtaining a PGMEA solution of a compound (9) (a quaternarized product of N,N,N',N'-tetramethyl hexanediamine with methoxy polyethylene glycol (45) monochloroacetate). The thus obtained solution had a solid content of 38.5% by mass, and the resulting product had a weight-average molecular weight of 3,800 (as a measured value under <Conditions 1>).

The reaction rate as determined from a ratio of a chlorine ion content to a total chlorine content in the reaction solution was 100 mol %, and the reaction rate as determined from reduction in an amine value in the reaction solution was 99 mol %, and $n_{av}$ was 2.0, $m_{av}$ was 0.0, and $k_{av}$ was 0.0. As a result of the NMR measurement, it was confirmed that the signals derived from the methyl group and the methylene group bonded to N of N,N,N',N'-tetramethyl hexanediamine were shifted from 2.2 ppm to 3.1 ppm and 3.9 ppm, respectively, by the reaction, and the signal derived from the methylene group located apart by further one position from N and the signal derived from the methylene group located apart by further two positions from N were shifted from 1.5 ppm and 1.4 ppm to 1.9 ppm and 1.5 ppm, respectively. In addition, it was confirmed that the signal derived from the methylene group to which chlorine of the methoxy polyethylene glycol (45) monochloroacetate was bonded, was shifted from 4.1 ppm to 4.7 ppm by the reaction.

That is, the compound (9) obtained in this Example was the compound represented by the following formula (e9). In the formula (e9), the methyl group (a) corresponds to $R^1$ in the general formula (I), and the bond (b) corresponds to $R^5$ (i.e., a single bond) adjacent to $R^1$ in the general formula (I).

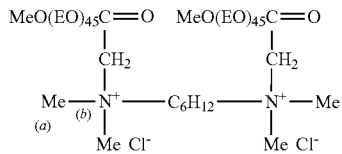

(e9)

Example 10

Synthesis of Compound (10) (Quaternarized Product of N,N,N',N'-Tetramethyl Hexanediamine with Methoxy Polyethylene Glycol (90) Monochloroacetate)

The same procedure as in Example 1 was repeated except for using 90 g of the methoxy polyethylene glycol (90) monochloroacetate obtained in Synthesis Example 9 in place of 80 g of the methoxy polypropylene glycol (29) polyethylene glycol (15) monochloroacetate, and changing the amount of N,N,N',N'-tetramethyl hexanediamine from 3.4 g to 2.0 g, and the amount of PGMEA from 120 g to 125 g, thereby obtaining a PGMEA solution of a compound (10) (a quaternarized product of N,N,N',N'-tetramethyl hexanediamine with methoxy polyethylene glycol (90) monochloroacetate). The thus obtained solution had a solid content of 41.9% by mass, and the resulting product had a weight-average molecular weight of 7,800 (as a measured value under <Conditions 1>).

The reaction rate as determined from a ratio of a chlorine ion content to a total chlorine content in the reaction solution was 95 mol %, and the reaction rate as determined from reduction in an amine value in the reaction solution was 98 mol %, and $n_{av}$ was 2.0, $m_{av}$ was 0.0, and $k_{av}$ was 0.0. As a result of the NMR measurement, it was confirmed that the signals derived from the methyl group and the methylene group bonded to N of N,N,N',N'-tetramethyl hexanediamine were shifted from 2.2 ppm to 3.1 ppm and 3.9 ppm, respectively, by the reaction, and the signal derived from the methylene group located apart by further one position from N and the signal derived from the methylene group located apart by further two positions from N were shifted from 1.5 ppm and 1.4 ppm to 1.9 ppm and 1.5 ppm, respectively. In addition, it was confirmed that the signal derived from the methylene group to which chlorine of the methoxy polyethylene glycol (90) monochloroacetate was bonded, was shifted from 4.1 ppm to 4.7 ppm by the reaction.

That is, the compound (10) obtained in this Example was the compound represented by the following formula (e10). In the formula (e10), the methyl group (a) corresponds to $R^1$ in the general formula (I), and the bond (b) corresponds to $R^5$ (i.e., a single bond) adjacent to $R^1$ in the general formula (I).

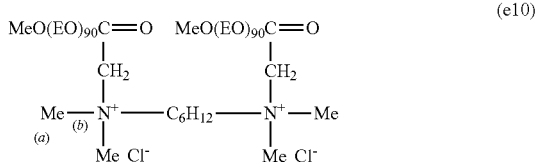

(e10)

Example 11

Synthesis of Compound (11) (Quaternarized Product of N,N,N',N'-Tetramethyl Hexanediamine with Oleyloxy Polyethylene Glycol (60) Monochloroacetate)

The same procedure as in Example 1 was repeated except for using 90 g of the oleyloxy polyethylene glycol (60) monochloroacetate obtained in Synthesis Example 10 in place of 80 g of the methoxy polypropylene glycol (29) polyethylene glycol (15) monochloroacetate, and changing the amount of N,N,N',N'-tetramethyl hexanediamine from 3.4 g to 2.8 g, thereby obtaining a PGMEA solution of a compound (11) (a quaternarized product of N,N,N',N'-tetramethyl hexanediamine with oleyloxy polyethylene glycol (60) monochloroacetate). The thus obtained solution had a solid content of 41.7% by mass, and the resulting product had a weight-average molecular weight of 6,700 (as a measured value under <Conditions 1>).

The reaction rate as determined from a ratio of a chlorine ion content to a total chlorine content in the reaction solution was 83 mol %, and the reaction rate as determined from reduction in an amine value in the reaction solution was 88 mol %, and $n_{av}$ was 1.8, $m_{av}$ was 0.2, and $k_{av}$ was 0.0. As a result of the NMR measurement, it was confirmed that the signals derived from the methyl group and the methylene group bonded to N of N,N,N',N'-tetramethyl hexanediamine were shifted from 2.2 ppm to 2.9 ppm and 3.9 ppm, respectively, by the reaction, and the signal derived from the methylene group located apart by further one position from N and the signal derived from the methylene group located apart by further two positions from N were shifted from 1.5 ppm and 1.4 ppm to 2.0 ppm and 1.6 ppm, respectively. In addition, it was confirmed that the signal derived from the methylene group to which chlorine of the oleyloxy polyethylene glycol (60) monochloroacetate was bonded, was shifted from 4.1 ppm to 4.8 ppm by the reaction.

That is, the compound (11) obtained in this Example was the compound represented by the following formula (e11). In the formula (e11), the methyl group (a) corresponds to $R^1$ in the general formula (I), and the bond (b) corresponds to $R^5$ (i.e., a single bond) adjacent to $R^1$ in the general formula (I).

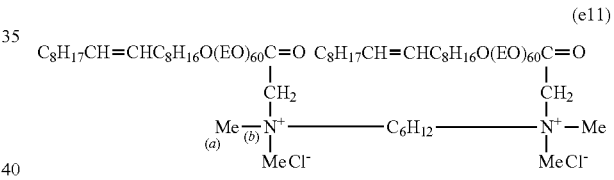

(e11)

Example 12

Synthesis of Compound (12) (Quaternarized Product of Pentamethyl Dipropylene Triamine with Lauroxy Polypropylene Glycol (29) Polyethylene Glycol (15) Monochloroacetate (Compound of the General Formula (I) in which n/m/k is 3/0/0))

The same procedure as in Example 1 was repeated except for using 90 g of the lauroxy polypropylene glycol (29) polyethylene glycol (15) monochloroacetate obtained in Synthesis Example 6 in place of 80 g of the methoxy polypropylene glycol (29) polyethylene glycol (15) monochloroacetate, and 2.6 g of pentamethyl dipropylene triamine ("Polycat-77" available from Air Products Japan, Inc.) in place of 3.4 g of N,N,N',N'-tetramethyl hexanediamine, and changing the amount of PGMEA from 120 g to 125 g, thereby obtaining a PGMEA solution of a compound (12) (a quaternarized product of pentamethyl dipropylene triamine with lauroxy polypropylene glycol (29) polyethylene glycol (15) monochloroacetate (a compound of the general formula (I) in which n/m/k is 3/0/0)). The thus obtained solution had a solid content of 43.5% by mass, and the resulting product had a weight-average molecular weight of 6,300 (as a measured value under <Conditions 1>).

The reaction rate as determined from a ratio of a chlorine ion content to a total chlorine content in the reaction solution was 86 mol %, and the reaction rate as determined from reduction in an amine value in the reaction solution was 84 mol %, and $n_{av}$ was 2.7, $m_{av}$ was 0.3, and $k_{av}$ was 0.0. As a result of the NMR measurement, it was confirmed that the signals derived from the methyl group and the methylene group bonded to N of pentamethyl dipropylene triamine were shifted from 2.2 ppm and 2.3 ppm to 3.6 ppm and 3.7 ppm, respectively, by the reaction, and the signal derived from the methylene group located apart by further one position from N was shifted from 1.6 ppm to 2.1 ppm. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

That is, the compound (12) obtained in this Example was the compound represented by the following formula (e12). In the formula (e12), the methyl group (a) corresponds to $R^1$ in the general formula (I), and the bond (b) corresponds to $R^5$ (i.e., a single bond) adjacent to $R^1$ in the general formula (I).

That is, the compound (13) obtained in this Example was the compound represented by the following formula (e13). In the formula (e13), the methyl group (a) corresponds to $R^1$ in the general formula (I), and the bond (b) corresponds to $R^5$ (i.e., a single bond) adjacent to $R^1$ in the general formula (I). Although the order of arrangement of the N-containing structural units was random, the following formula represents a typical example of the structure in which the two end N atoms were quaternarized.

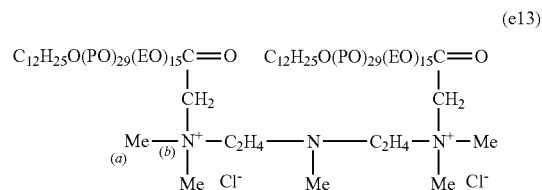

(e13)

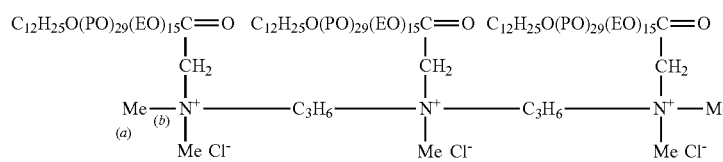

(e12)

Example 13

Synthesis of Compound (13) (Quaternarized Product of Pentamethyl Diethylene Triamine with Lauroxy Polypropylene Glycol (29) Polyethylene Glycol (15) Monochloroacetate (Compound of the General Formula (I) in which n/m/k is 2/1/0))

The same procedure as in Example 12 was repeated except for using 7.3 g of pentamethyl diethylene triamine ("KAOLIZER No. 3" available from Kao Corporation) in place of 2.5 g of pentamethyl dipropylene triamine, and changing the amount of lauroxy polypropylene glycol (29) polyethylene glycol (15) monochloroacetate from 90 g to 200 g, and the amount of PGMEA from 125 g to 300 g, thereby obtaining a PGMEA solution of a compound (13) (a quaternarized product of pentamethyl diethylene triamine with lauroxy polypropylene glycol (29) polyethylene glycol (15) monochloroacetate (a compound of the general formula (I) in which n/m/k is 2/1/0)). The thus obtained solution had a solid content of 40.8% by mass, and the resulting product had a weight-average molecular weight of 3,800 (as a measured value under <Conditions 1>).

The reaction rate as determined from a ratio of a chlorine ion content to a total chlorine content in the reaction solution was 92 mol %, and the reaction rate as determined from reduction in an amine value in the reaction solution was 66 mol %, and $n_{av}$ was 1.8, $m_{av}$ was 1.2, and $k_{av}$ was 0.0. As a result of the NMR measurement, it was confirmed that the signals derived from the methyl group and the methylene group bonded to N of pentamethyl dipropylene triamine were partially shifted from 2.2 ppm and 2.5 ppm to 3.7 ppm and 3.8 ppm, respectively, by the reaction. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

Example 14

Synthesis of Compound (14) (Quaternarized Product of Pentamethyl Dipropylene Triamine with Lauroxy Polypropylene Glycol (29) Polyethylene Glycol (15) Monochloroacetate (Compound of the General Formula (I) in which n/m/k is 2/1/0))

The same procedure as in Example 12 was repeated except for changing the amount of lauroxy polypropylene glycol (29) polyethylene glycol (15) monochloroacetate from 90 g to 200 g, the amount of pentamethyl dipropylene triamine from 2.6 g to 8.4 g, and the amount of PGMEA from 125 g to 300 g, thereby obtaining a PGMEA solution of a compound (14) (a quaternarized product of pentamethyl dipropylene triamine with lauroxy polypropylene glycol (29) polyethylene glycol (15) monochloroacetate (a compound of the general formula (I) in which n/m/k is 2/1/0)). The thus obtained solution had a solid content of 40.6% by mass, and the resulting product had a weight-average molecular weight of 4,100 (as a measured value under <Conditions 1>).

The reaction rate as determined from a ratio of a chlorine ion content to a total chlorine content in the reaction solution was 93 mol %, and the reaction rate as determined from reduction in an amine value in the reaction solution was 66 mol %, and $n_{av}$ was 1.9, $m_{av}$ was 1.1, and $k_{av}$ was 0.0. As a result of the NMR measurement, it was confirmed that the signals derived from the methyl group and the methylene group bonded to N of pentamethyl dipropylene triamine were shifted from 2.2 ppm and 2.3 ppm to 3.6 ppm and 3.7 ppm, respectively, by the reaction, and the signal derived from the methylene group located apart by further one position from N was partially shifted from 1.6 ppm to 2.1 ppm. In addition, it was confirmed that the signal derived from the methylene group to which chlorine of the lauroxy polypropylene glycol

(29) polyethylene glycol (15) monochloroacetate was bonded, was shifted from 4.1 ppm to 4.9 ppm by the reaction.

That is, the compound (14) obtained in this Example was the compound represented by the following formula (e14), In the formula (e14), the methyl group (a) corresponds to $R^1$ in the general formula (I), and the bond (b) corresponds to $R^5$ (i.e., a single bond) adjacent to $R^1$ in the general formula (I). Although the order of arrangement of the N-containing structural units was random, the following formula represents a typical example of the structure in which the two end N atoms were quaternarized.

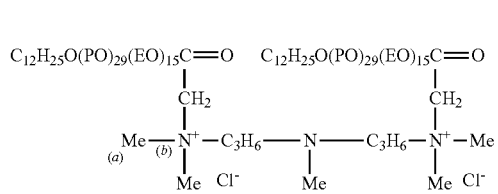

(e14)

Example 15

Synthesis of Compound (15) (Quaternarized Product of Pentamethyl Dipropylene Triamine with Lauroxy Polypropylene Glycol (29) Polyethylene Glycol (15) Monochloroacetate (Compound of the General Formula (I) in which n/m/k is 1/2/0))

The same procedure as in Example 14 was repeated except for changing the amount of pentamethyl dipropylene triamine from 8.4 g to 16.7 g, thereby obtaining a PGMEA solution of a compound (15) (a quaternarized product of pentamethyl dipropylene triamine with lauroxy polypropylene glycol (29) polyethylene glycol (15) monochloroacetate (a compound of the general formula (I) in which n/m/k is 1/2/0)). The thus obtained solution had a solid content of 40.9% by mass, and the resulting product had a weight-average molecular weight of 2,200 (as a measured value under <Conditions 1>).

The reaction rate as determined from a ratio of a chlorine ion content to a total chlorine content in the reaction solution was 95 mol %, and the reaction rate as determined from reduction in an amine value in the reaction solution was 33 mol %, and $n_{av}$ was 0.9, $m_{av}$ was 2.1, and $k_{av}$ was 0.0. As a result of the NMR measurement, it was confirmed that the signals derived from the methyl group and the methylene group bonded to N of pentamethyl dipropylene triamine were shifted from 2.2 ppm and 2.3 ppm to 3.6 ppm and 3.7 ppm, respectively, by the reaction, and the signal derived from the methylene group located apart by further one position from N was partially shifted from 1.6 ppm to 2.1 ppm. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

That is, the compound (15) obtained in this Example was the compound represented by the following formula (e15). In the formula (e15), the methyl group (a) corresponds to $R^1$ in the general formula (I), and the bond (b) corresponds to $R^5$ (i.e., a single bond) adjacent to $R^1$ in the general formula (I). Although the order of arrangement of the N-containing structural units was random, the following formula represents a typical example of the structure in which the two end N atoms were quaternarized.

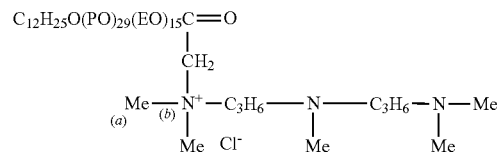

(e15)

Example 16

Synthesis of Compound (16) (Quaternarized Product of Pentamethyl Dipropylene Triamine with Lauroxy Polypropylene Glycol (29) Polyethylene Glycol (15) Monochloroacetate and Dimethyl Sulfate (Compound of the General Formula (I) in which n/m/k is 2/0/1)

A glass vessel was charged with 150 g of the PGMEA solution obtained in Example 14, and an inside of the vessel was purged with nitrogen. Then, a mixed solution containing 1.6 g of dimethyl sulfate (available from Wako Pure Chemical Industries, Ltd.) and 10 g of PGMEA was added dropwise into the vessel at a normal temperature while stirring. After further stirring for 5 min, the contents of the vessel were stirred in a nitrogen atmosphere at 85° C. for 3 h and thereby reacted. The resulting reaction solution was cooled, thereby obtaining a PGMEA solution of a compound (16) (a quaternarized product of pentamethyl dipropylene triamine with lauroxy polypropylene glycol (29) polyethylene glycol (15) monochloroacetate and dimethyl sulfate (a compound of the general formula (I) in which n/m/k is 2/0/1)). The thus obtained solution had a solid content of 38.7% by mass, and the resulting product had a weight-average molecular weight of 4,100 (as a measured value under <Conditions 1>).

The reaction rate as determined from reduction in an amine value in the reaction solution was 99 mol %, and $n_{av}$ was 2.0, $m_{av}$ was 0.0, and $k_{av}$ was 1.0. As a result of the NMR measurement, it was confirmed that the signals derived from the methyl group and the methylene group bonded to N of pentamethyl dipropylene triamine were shifted from 2.2 ppm and 2.3 ppm to 3.6 ppm and 3.7 ppm, respectively, by the reaction, and the signal derived from the methylene group located apart by further one position from N was shifted from 1.6 ppm to 2.1 ppm. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

That is, the compound (16) obtained in this Example was the compound represented by the following formula (e16). In the formula (e16), the methyl group (a) corresponds to $R^1$ in the general formula (I), and the bond (b) corresponds to $R^5$ (i.e., a single bond) adjacent to $R^1$ in the general formula (I). Although the order of arrangement of the N-containing structural units was random, the following formula represents a typical example of the structure in which the two end N atoms were quaternarized with the lauroxy polypropylene glycol (29) polyethylene glycol (15) monochloroacetate, and the central N atom was quaternarized with the dimethyl sulfate.

(e16)

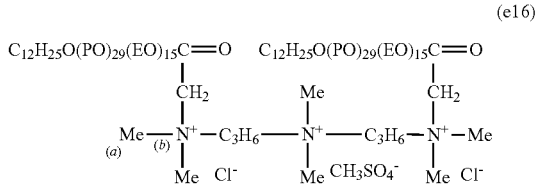

Example 17

Synthesis of Compound (17) (Quaternarized Product of Pentamethyl Dipropylene Triamine with Lauroxy Polypropylene Glycol (29) Polyethylene Glycol (15) Monochloroacetate and Dimethyl Sulfate (Compound of the General Formula (I) in which n/m/k is 1/0/2))

The same procedure as in Example 16 was repeated except for using the PGMEA solution obtained in Example 15 in pace of the PGMEA solution obtained in Example 14, and changing the amount of dimethyl sulfate from 1.6 g to 3.2 g, thereby obtaining a PGMEA solution of a compound (17) (a quaternarized product of pentamethyl dipropylene triamine with lauroxy polypropylene glycol (29) polyethylene glycol (15) monochloroacetate and dimethyl sulfate (a compound of the general formula (I) in which n/m/k is 1/0/2)). The thus obtained solution had a solid content of 39.5% by mass, and the resulting product had a weight-average molecular weight of 2,200 (as a measured value under <Conditions 1>).

The reaction rate as determined from reduction in an amine value in the reaction solution was 99 mol %, and $n_{av}$ was 1.0, $m_{av}$ was 0.0, and $k_{av}$ was 2.0. As a result of the NMR measurement, it was confirmed that the signals derived from the methyl group and the methylene group bonded to N of pentamethyl dipropylene triamine were shifted from 2.2 ppm and 2.3 ppm to 3.6 ppm and 3.7 ppm, respectively, by the reaction, and the signal derived from the methylene group located apart by further one position from N was shifted from 1.6 ppm to 2.1 ppm. In addition, it was confirmed that the signal derived from the methylene group to which chlorine of the lauroxy polypropylene glycol (29) polyethylene glycol (15) monochloroacetate was bonded, was shifted from 4.1 ppm to 4.9 ppm by the reaction.

That is, the compound (17) obtained in this Example was the compound represented by the following formula (e17). In the formula (e17), the methyl group (a) corresponds to $R^1$ in the general formula (I), and the bond (b) corresponds to $R^5$ (i.e., a single bond) adjacent to $R^1$ in the general formula (I). Although the order of arrangement of the N-containing structural units was random, the following formula represents a typical example of the structure in which one of the end N atoms was quaternarized with the lauroxy polypropylene glycol (29) polyethylene glycol (15) monochloroacetate, and the remaining N atoms were quaternarized with the dimethyl sulfate.

(e17)

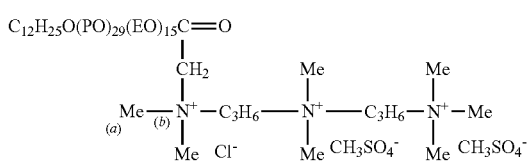

Example 18

Synthesis of Compound (18) (Quaternarized Product of N,N,N',N'-Tetramethyl Propanediamine with Lauroxy Polypropylene Glycol (29) Monochloroacetate (Compound of the General Formula (I) in which n/m/k is 2/0/0))

The same procedure as in Example 1 was repeated except for using 250 g of the lauroxy polypropylene glycol (29) monochloroacetate obtained in Synthesis Example 11 in place of 80 g of the methoxy polypropylene glycol (29) polyethylene glycol (15) monochloroacetate, and 9.6 g of N,N,N', N'-tetramethyl propanediamine ("KAOLIZER No. 2" available from Kao Corporation) in place of 3.4 g of N,N,N',N'-tetramethyl hexanediamine ("KAOLIZER No. 1" available from Kao Corporation), and changing the amount of PGMEA from 120 g to 250 g, thereby obtaining a PGMEA solution of a compound (18) (a quaternarized product of N,N,N',N'-tetramethyl propanediamine with lauroxy polypropylene glycol (29) monochloroacetate (a compound of the general formula (I) in which n/m/k is 2/0/0)). The thus obtained solution had a solid content of 49.9% by mass, and the resulting product had a weight-average molecular weight of 3,100 (as a measured value under <Conditions 1>).

The reaction rate as determined from a ratio of a chlorine ion content to a total chlorine content in the reaction solution was 93 mol %, and the reaction rate as determined from reduction in an amine value in the reaction solution was 90 mol %, and $n_{av}$ was 1.8, $m_{av}$ was 0.2, and $k_{av}$ was 0.0. As a result of the NMR measurement, it was confirmed that the signals derived from the methyl group and the methylene group bonded to N of N,N,N',N'-tetramethyl propanediamine were shifted from 2.2 ppm and 2.3 ppm to 3.0 ppm and 4.0 ppm, respectively, by the reaction, and the signal derived from the methylene group located apart by further one position from N was shifted from 1.6 ppm to 2.8 ppm. In addition, it was confirmed that the signal derived from the methylene group to which chlorine of the lauroxy polypropylene glycol (29) monochloroacetate was bonded, was shifted from 4.1 ppm to 4.9 ppm by the reaction.

That is, the compound (18) obtained in this Example was the compound represented by the following formula (e18). In the formula (e18), the methyl group (a) corresponds to $R^1$ in the general formula (I), and the bond (b) corresponds to $R^5$ (i.e., a single bond) adjacent to $R^1$ in the general formula (I).

(e18)

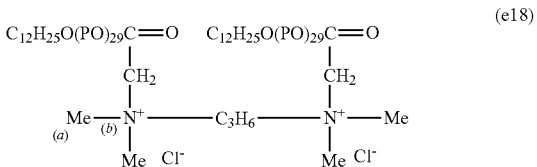

Example 19

Synthesis of Compound (19) (Quaternarized Product of N,N,N',N'-Tetramethyl Propanediamine with Lauroxy Polypropylene Glycol (15) Polyethylene Glycol (29) Monochloroacetate (Compound of the General Formula (I) in which n/m/k is 2/0/0))

The same procedure as in Example 1 was repeated except for using the lauroxy polypropylene glycol (15) polyethylene glycol (29) monochloroacetate obtained in Synthesis Example 12 in place of the methoxy polypropylene glycol (29) polyethylene glycol (15) monochloroacetate, and 2.7 g of N,N,N',N'-tetramethyl propanediamine ("KAOLIZER No. 2" available from Kao Corporation) in place of 3.4 g of N,N,N',N'-tetramethyl hexanediamine ("KAOLIZER No. 1" available from Kao Corporation), thereby obtaining a PGMEA solution of a compound (19) (a quaternarized product of N,N,N',N'-tetramethyl propanediamine with lauroxy polypropylene glycol (15) polyethylene glycol (29) monochloroacetate (a compound of the general formula (I) in which n/m/k is 2/0/0)). The thus obtained solution had a solid content of 41.8% by mass, and the resulting product had a weight-average molecular weight of 3,500 (as a measured value under <Conditions 1>).

The reaction rate as determined from a ratio of a chlorine ion content to a total chlorine content in the reaction solution was 94 mol %, and the reaction rate as determined from reduction in an amine value in the reaction solution was 93 mol %, and $n_{av}$ was 1.9, $m_{av}$ was 0.1, and $k_{av}$ was 0.0. As a result of the NMR measurement, it was confirmed that the signals derived from the methyl group and the methylene group bonded to N of N,N,N',N'-tetramethyl propanediamine were shifted from 2.2 ppm and 2.3 ppm to 3.0 ppm and 4.0 ppm, respectively, by the reaction, and the signal derived from the methylene group located apart by further one position from N was shifted from 1.6 ppm to 2.8 ppm. In addition, it was confirmed that the signal derived from the methylene group to which chlorine of the lauroxy polypropylene glycol (15) polyethylene glycol (29) monochloroacetate was bonded, was shifted from 4.1 ppm to 4.9 ppm by the reaction.

That is, the compound (19) obtained in this Example was the compound represented by the following formula (e19). In the formula (e19), the methyl group (a) corresponds to $R^1$ in the general formula (I), and the bond (b) corresponds to $R^5$ (i.e., a single bond) adjacent to $R^1$ in the general formula W.

(e19)

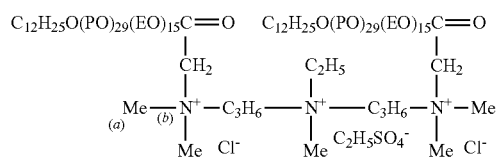

Example 20

Synthesis of Compound (20) (Quaternarized Product of Pentamethyl Dipropylene Triamine with Lauroxy Polypropylene Glycol (29) Polyethylene Glycol (15) Monochloroacetate and Dimethyl Sulfate (Compound of the General Formula (I) in which n/m/k is 2/0/1))

The same procedure as in Example 16 was repeated except for using 2.0 g of diethyl sulfate in pace of 1.6 g of dimethyl sulfate, thereby obtaining a PGMEA solution of a compound (20) (a quaternarized product of pentamethyl dipropylene triamine with lauroxy polypropylene glycol (29) polyethylene glycol (15) monochloroacetate and dimethyl sulfate (a compound of the general formula (I) in which n/m/k is 2/0/1)). The thus obtained solution had a solid content of 38.7% by mass, and the resulting product had a weight-average molecular weight of 4,100 (as a measured value under <Conditions 1>), and $n_{av}$ was 2.0, $m_{av}$ was 0.0, and $k_{av}$ was 1.0.

That is, the compound (20) obtained in this Example was the compound represented by the following formula (e20). In the formula (e20), the methyl group (a) corresponds to $R^1$ in the general formula (I), and the bond (b) corresponds to $R^5$ (i.e., a single bond) adjacent to $R^1$ in the general formula (I). Although the order of arrangement of the N-containing structural units was random, the following formula represents a typical example of the structure in which one of the end N atoms was quaternarized with the lauroxy polypropylene glycol (29) polyethylene glycol (15) monochloroacetate, and the remaining N atoms were quaternarized with the dimethyl sulfate.

(e20)

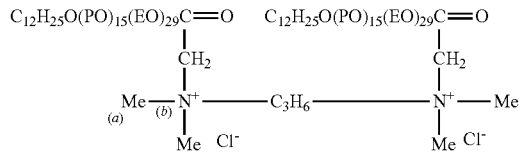

Example 21

Synthesis of Compound (21) (Quaternarized Product of Pentamethyl Dipropylene Triamine with Lauroxy Polypropylene Glycol (29) Polyethylene Glycol (15) Monochloroacetate and Methyl p-Toluenesulfonate (Compound of the General Formula (I) in which n/m/k is 2/0/1))

The same procedure as in Example 16 was repeated except for using 2.4 g of methyl p-toluenesulfonate in pace of 1.6 g of dimethyl sulfate, thereby obtaining a PGMEA solution of a compound (21) (a quaternarized product of pentamethyl dipropylene triamine with lauroxy polypropylene glycol (29) polyethylene glycol (15) monochloroacetate and methyl p-toluenesulfonate (a compound of the general formula (I) in which n/m/k is 2/0/1)). The thus obtained solution had a solid content of 38.9% by mass, and the resulting product had a weight-average molecular weight of 4,100 (as a measured value under <Conditions 1>), and $n_{av}$ was 2.0, $m_{av}$ was 0.0, and $k_{av}$ was 1.0.

That is, the compound (21) obtained in this Example was the compound represented by the following formula (e21). In the formula (e21), the methyl group (a) corresponds to $R^1$ in the general formula (I), and the bond (b) corresponds to $R^5$ (i.e., a single bond) adjacent to R' in the general formula (I). Although the order of arrangement of the N-containing structural units was random, the following formula represents a typical example of the structure in which one of the end N atoms was quaternarized with the lauroxy polypropylene glycol (29) polyethylene glycol (15) monochloroacetate, and the remaining N atoms were quaternarized with the methyl p-toluenesulfonate.

(e21)

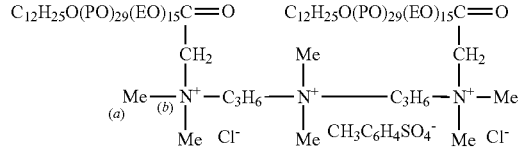

Comparative Example 1

Synthesis of Compound (22) (Quaternarized Product of N,N,N',N'-Tetramethyl Hexanediamine with Methyl Chloroacetate)

A separable flask equipped with a reflux condenser, a thermometer, a nitrogen inlet tube and a stirrer was charged with 40.2 g of N,N,N',N'-tetramethyl hexanediamine ("KA-OLIZER No. 1" available from Kao Corporation) and 200 g of methanol, and, and then an inside of the flask was purged with nitrogen. While stirring at 75° C., 50 g of methyl chloroacetate (reagent available from Kanto Chemical Co., Inc.) was added dropwise to the flask over 30 min, and then the contents of the flask were reacted for 20 h. Thereafter, using an evaporator, methanol was removed from the resulting reaction solution at 60° C. under reduced pressure, thereby obtaining a compound (22) (a quaternarized product of N,N,N',N'-tetramethyl hexanediamine with methyl chloroacetate). The thus obtained compound had a solid content of 100% by mass.

The reaction rate as determined from a ratio of a chlorine ion content to a total chlorine content in the reaction solution was 98%, and the reaction rate as determined from reduction in an amine value in the reaction solution was 99%. As a result of the NMR measurement, it was confirmed that the signals derived from the methyl group and the methylene group bonded to N of N,N,N',N'-tetramethyl hexanediamine were shifted from 2.2 ppm to 3.4 ppm and 3.6 ppm, respectively, by the reaction, and the signal derived from the methylene group located apart by further one position from N and the signal derived from the methylene group located apart by further two positions from N were shifted from 1.5 ppm and 1.4 ppm to 1.9 ppm and 1.5 ppm, respectively. In addition, it was confirmed that the signal derived from the methylene group to which chlorine of the methyl chloroacetate was bonded, was shifted from 4.1 ppm to 4.8 ppm by the reaction.

That is, the compound (22) obtained in this Example was the compound of the general formula (I) in which no ($R^7O$) is present, as represented by the following formula (ee1). In the formula (ee1), the methyl group (a) corresponds to $R^1$ in the general formula (I), and the bond (b) corresponds to $R^5$ (i.e., a single bond) adjacent to $R^1$ in the general formula (I).

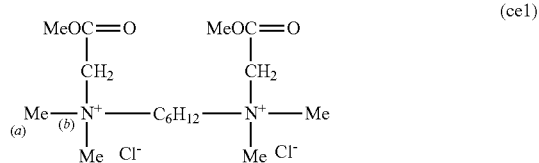

(ce1)

Examples of Use of Compound of the Present Invention

A pigment dispersion was prepared by using the compound of the present invention. The average particle size of pigment particles in the pigment dispersion was measured by the following method.

[Measurement of Average Particle Size of Pigment Particles in Pigment Dispersion]

A glass bottle ("Screw Vial No. 5" available from Maruemu Corporation) was charged with 15 g of PGMEA, and 0.01 g of the pigment dispersion obtained in the respective Examples and Comparative Examples was added thereto, followed by stirring the contents of the bottle using a test tube mixer ("Minishaker MS1" available from IKA. Co., Ltd.) at 2,500 rpm for 1 min. Using a particle size measuring device ("SZ-100" available from HORIBA Ltd.), the sizes of particles in the pigment dispersion were measured at 25° C. by inputting measuring conditions including a refractive index of diketopyrrolopyrrole-based pigment particles of 1.51, a refractive index of PGMEA of 1.400 and a viscosity of PGMEA of 1.136 mPa·s, and a measuring temperature of 25° C. to the device. A cumulant average particle size of the pigment particles determined by cumulant analysis on the basis of a particle size analysis-photon correlation spectroscopy (JIS Z 8826) was regarded as an average particle size of the particles in the pigment dispersion.

[Measurement of Average Particle Size of Pigment Particles in Pigment Dispersion after Storage]

The pigment dispersion whose pigment concentration was adjusted to 10% by mass was filled into a closed glass vessel, and allowed to stand at 40° C. for 7 days. The average particle size of pigment particles in the pigment dispersion was measured by the same method as described in the above "Measurement of average particle size of pigment particles in pigment dispersion", and defined as an average particle size thereof after storage.

Example 22

Preparation of Pigment Dispersion (1)

A 500 mL plastic vessel was charged with 16.1 g of the solution containing the compound (1) obtained in Example 1 (solid content: 7.0 g) and 141.4 g of PGMEA. Further, 17.5 g of C.I. Pigment Red 254 as a diketopyrrolopyrrole-based pigment ("CHROMOFINE RED 6156EC" available from Dainichiseika Color & Chemicals Mfg. Co., Ltd.) and 262.5 g of 0.3 mmφ zirconia beads were added to the plastic vessel, and the contents of the plastic vessel were stirred for 20 h using a disperser ("PAINT SHAKER" available from Asada Iron Works Co., Ltd.) and then subjected to filtration to remove the zirconia beads therefrom, thereby obtaining a pigment dispersion (1).

Examples 23 to 42 and Comparative Example 2

Preparation of Pigment Dispersions (2) to (22)

The same procedure as in Example 22 was repeated except for using the respective compounds (2) to (22) obtained in Examples 2 to 21 and Comparative Example 1, respectively, in place of the compound (1) obtained in Example 1 such that the solid content of each compound was 7.0 g, and controlling an amount of PGMEA added such that a total amount of each compound and PGMEA was 157.5 g, thereby obtaining pigment dispersions (2) to (22).

The evaluation results of the thus obtained pigment dispersions (1) to (22) are shown in Table 1.

| | Compound | Number of adsorbing groups*2 (n + m + k) | Structure of compound*1 | | | | | | | | | | | Average particle size | |
|---|---|---|---|---|---|---|---|---|---|---|---|---|---|---|---|
| | | | $R^1$ | $R^2$ | $R^3$ | $R^4$ | $R^{5*3}$ | $R^6$ | $(R^7O)_a$ | $R^8$ | $(M^1)^-$ | $(M^2)^-$ | n/m/k | Dispersed particles (nm) | After storage (nm) |
| TABLE 1-1 | | | | | | | | | | | | | | | |
| Example 22 | (1) | 2 | $CH_3$ | $CH_3$ | None | $CH_3$ | $C_6H_{12}$ | $CH_2$ | $(PO)_{29}(EO)_{15}$ | $CH_3$ | $Cl^-$ | — | 2/0/0 | 37.7 | 48.1 |
| Example 23 | (2) | 2 | $CH_3$ | $CH_3$ | None | $CH_3$ | $C_3H_6$ | $CH_2$ | $(PO)_{29}(EO)_{15}$ | $CH_3$ | $Cl^-$ | — | 2/0/0 | 39.0 | 49.2 |
| Example 24 | (3) | 4(*4) | $C_6H_{12}OH$ | $C_6H_{12}OH$ | None | $CH_3$ | $C_6H_{12}$ | $CH_2$ | $(PO)_{29}(EO)_{15}$ | $CH_3$ | $Cl^-$ | — | 4/0/0 (*4) | 65.5 | 99.6 |
| Example 25 | (4) | 9(*4) | $C_6H_{12}OH$ | $C_6H_{12}OH$ | None | $CH_3$ | $C_6H_{12}$ | $CH_2$ | $(PO)_{29}(EO)_{15}$ | $CH_3$ | $Cl^-$ | — | 9/0/0 (*4) | 100.6 | 111.9 |
| Example 26 | (5) | 2 | $CH_3$ | $CH_3$ | None | $CH_3$ | $C_6H_{12}$ | $CH_2$ | $(PO)_{29}(EO)_{15}$ | $C_{12}H_{25}$ | $Cl^-$ | — | 2/0/0 | 37.4 | 44.4 |
| Example 27 | (6) | 2 | $CH_3$ | $CH_3$ | None | $CH_3$ | $C_3H_6$ | $CH_2$ | $(PO)_{29}(EO)_{15}$ | $C_{12}H_{25}$ | $Cl^-$ | — | 2/0/0 | 37.5 | 47.9 |
| Example 28 | (7) | 2 | $CH_3$ | $CH_3$ | None | $CH_3$ | $C_9H_{18}$ | $CH_2$ | $(PO)_{29}(EO)_{15}$ | $C_{12}H_{25}$ | $Cl^-$ | — | 2/0/0 | 38.0 | 45.6 |
| Example 29 | (8) | 2 | $CH_3$ | $CH_3$ | None | $CH_3$ | $C_6H_{12}$ | $CH_2$ | $(EO)_{23}$ | $CH_3$ | $Cl^-$ | — | 2/0/0 | 66.1 | 116.0 |
| Example 30 | (9) | 2 | $CH_3$ | $CH_3$ | None | $CH_3$ | $C_6H_{12}$ | $CH_2$ | $(EO)_{45}$ | $CH_3$ | $Cl^-$ | — | 2/0/0 | 53.9 | 69.5 |
| Example 31 | (10) | 2 | $CH_3$ | $CH_3$ | None | $CH_3$ | $C_6H_{12}$ | $CH_2$ | $(EO)_{90}$ | $CH_3$ | $Cl^-$ | — | 2/0/0 | 57.2 | 72.9 |
| Example 32 | (11) | 2 | $CH_3$ | $CH_3$ | None | $CH_3$ | $C_6H_{12}$ | $CH_2$ | $(EO)_{60}$ | $C_{18}H_{35}$ | $Cl^-$ | — | 2/0/0 | 42.7 | 66.1 |
| TABLE 1-2 | | | | | | | | | | | | | | | |
| Example 33 | (12) | 3 | $CH_3$ | $CH_3$ | None | $CH_3$ | $C_3H_6$ | $CH_2$ | $(PO)_{29}(EO)_{15}$ | $C_{12}H_{25}$ | $Cl^-$ | — | 3/0/0 | 45.9 | 56.9 |
| Example 34 | (13) | 3 | $CH_3$ | $CH_3$ | None | $CH_3$ | $C_2H_4$ | $CH_2$ | $(PO)_{29}(EO)_{15}$ | $C_{12}H_{25}$ | $Cl^-$ | — | 2/1/0 | 38.7 | 41.3 |
| Example 35 | (14) | 3 | $CH_3$ | $CH_3$ | None | $CH_3$ | $C_3H_6$ | $CH_2$ | $(PO)_{29}(EO)_{15}$ | $C_{12}H_{25}$ | $Cl^-$ | — | 2/1/0 | 39.4 | 41.1 |
| Example 36 | (15) | 3 | $CH_3$ | $CH_3$ | None | $CH_3$ | $C_3H_6$ | $CH_2$ | $(PO)_{29}(EO)_{15}$ | $C_{12}H_{25}$ | $Cl^-$ | — | 1/2/0 | 53.4 | 115.3 |
| Example 37 | (16) | 3 | $CH_3$ | $CH_3$ | $CH_3$ | $CH_3$ | $C_3H_6$ | $CH_2$ | $(PO)_{29}(EO)_{15}$ | $C_{12}H_{25}$ | $Cl^-$ | $CH_3SO_4^-$ | 2/0/1 | 42.4 | 48.5 |
| Example 38 | (17) | 3 | $CH_3$ | $CH_3$ | $CH_3$ | $CH_3$ | $C_3H_6$ | $CH_2$ | $(PO)_{29}(EO)_{15}$ | $C_{12}H_{25}$ | $Cl^-$ | $CH_3SO_4^-$ | 1/0/2 | 59.6 | 86.3 |
| Example 39 | (18) | 2 | $CH_3$ | $CH_3$ | None | $CH_3$ | $C_3H_6$ | $CH_2$ | $(PO)_{29}$ | $C_{12}H_{25}$ | $Cl^-$ | — | 2/0/0 | 51.1 | 63.2 |
| Example 40 | (19) | 2 | $CH_3$ | $CH_3$ | None | $CH_3$ | $C_3H_6$ | $CH_2$ | $(PO)_{15}(EO)_{29}$ | $C_{12}H_{25}$ | $Cl^-$ | — | 2/0/0 | 42.8 | 53.7 |
| Example 41 | (20) | 3 | $CH_3$ | $CH_3$ | $C_2H_5$ | $CH_3$ | $C_3H_6$ | $CH_2$ | $(PO)_{29}(EO)_{15}$ | $C_{12}H_{25}$ | $Cl^-$ | $C_2H_5SO_4^-$ | 2/0/1 | 44.1 | 51.3 |
| Example 42 | (21) | 3 | $CH_3$ | $CH_3$ | $CH_3$ | $CH_3$ | $C_3H_6$ | $CH_2$ | $(PO)_{29}(EO)_{15}$ | $C_{12}H_{25}$ | $Cl^-$ | $CH_3C_6H_4SO_3^-$ | 2/0/1 | 43.2 | 49.6 |
| Comp. Ex. 2 | (22) | 2 | $CH_3$ | $CH_3$ | None | $CH_3$ | $C_6H_{12}$ | $CH_2$ | a = 0 | $CH_3$ | $Cl^-$ | — | 2/0/0 | 399.0 | ** |

Note
*1 Respective substituent groups and numerical values in the general formula (I);
*2 Number of nitrogen atoms in the compound;
*3 All $R^5$ groups adjacent to $R^1$ represent a single bond;
*4 Central value; and
** Not measurable.

From Table 1, it was confirmed that the pigment particles dispersed in the pigment dispersions (1) to (21) obtained in Examples 22 to 42 had a small average particle size as well as a small average particle size after storage, and exhibited a good pigment dispersibility, and further the dispersions were excellent in storage stability, as compared to the pigment dispersion (22) obtained in Comparative Example 2. Therefore, it is recognized that the compound of the present invention is useful as a dispersant for pigment dispersions.

The invention claimed is:

1. A quaternary ammonium salt compound represented by the general formula (I):

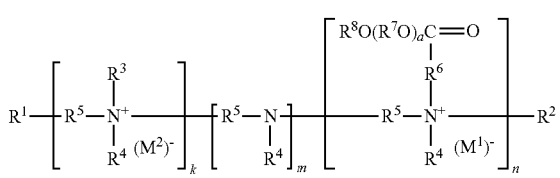

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms with the proviso that $R^5$ adjacent to $R^1$ represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order.

2. The compound according to claim 1, wherein (n+m+k) is 2 or 3, n is not less than 1 and not more than 3, m is 0 or 1, and k is 0 or 1.

3. The compound according to claim 1, wherein the compound is represented by the general formula (I-1):

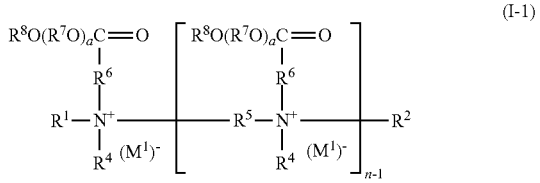

wherein $R^1$, $R^2$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(M^1)^-$ is an anion; n is an integer of not less than 2 and not more than 22; and if a plurality of ($R^7O$) groups are present, the groups may be the same or different from each other.

4. The compound according to claim 3, wherein n is 2 or 3.

5. The compound according to claim 1, wherein ($R^7O$) contains a structural unit derived from propyleneoxide.

6. The compound according to claim 1, wherein a is a number of not less than 15 and not more than 100.

7. The compound according to claim 1, wherein number of carbon atoms of the alkanediyl group represented by $R^5$ is not less than 3 and not more than 18.

8. The compound according to claim 1, wherein $R^1$, $R^2$ and $R^4$ are each a methyl group.

9. The compound according to claim 1, wherein $(R^7O)_a$ is a structural unit represented by the general formula (I-a):

$$*\!\!-\!\!(PO)_b\!\!-\!\!(EO)_c\!\!-\!\!* \qquad (I\text{-}a)$$

wherein PO is a propyleneoxide unit; EO is an ethyleneoxide unit; b and c represent average molar numbers of addition of PO and EO, respectively, and b is a number of not less than 0 and not more than 100, and c is a number of not less than 0 and not more than 100, with the proviso that (b+c) is not less than 1 and not more than 100; and * represents a bonding site.

10. A process for producing a quaternary ammonium salt compound represented by the general formula (I), comprising a step of reacting a halogenated alkyl ester compound represented by the general formula (II) with a polyamine compound represented by the general formula (III):

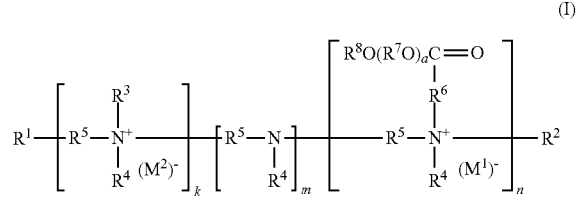

wherein $R^1$, $R^2$, $R^3$ and $R^4$ may be the same or different from each other, and are each a hydrocarbon group having not less than 1 and not more than 10 carbon atoms in which a part of hydrogen atoms may be substituted with a hydroxyl group; $R^5$ is an alkanediyl group having not less than 1 and not more than 18 carbon atoms with the proviso that $R^5$ adjacent to $R^1$ represents a single bond; $R^6$ is an alkanediyl group having not less than 1 and not more than 4 carbon atoms; $R^7$ is an alkanediyl group having not less than 2 and not more than 4 carbon atoms; $R^8$ is an aliphatic hydrocarbon group having not less than 1 and not more than 18 carbon atoms; a represents an average molar number of addition of ($R^7O$) and is a number of not less than 1 and not more than 100; $(m^1)^-$ and $(M^2)^-$ are each independently an anion; n, m and k each represent a molar number of respective structural units, and (n+m+k) is an integer of not less than 2 and not more than 22, n is an integer of not less than 1 and not more than 22, m is an integer of not less than 0 and not more than 21, and k is an integer of not less than 0 and not more than 21; and if a plurality of ($R^7O$) groups are present, the groups may be the same or different from each other, and the respective structural units may be arranged in any order;

(II)

wherein $R^6$, $R^7$, $R^8$ and a are the same as defined above; and X is a halogen atom; and

(III)

wherein $R^1$, $R^2$, $R^4$, $R^5$ and (n+m+k) are the same as defined above.

* * * * *